United States Patent
Binder

(10) Patent No.: US 9,757,624 B2
(45) Date of Patent: *Sep. 12, 2017

(54) MOTION SENSING DEVICE WHICH PROVIDES A VISUAL INDICATION WITH A WIRELESS SIGNAL

(71) Applicant: May Patents Ltd., Hod Hasharon (IL)

(72) Inventor: Yehuda Binder, Ramat Gan (IL)

(73) Assignee: May Patents Ltd., Hod-Hasharon (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/378,225

(22) Filed: Dec. 14, 2016

(65) Prior Publication Data

US 2017/0087419 A1    Mar. 30, 2017

Related U.S. Application Data

(60) Continuation of application No. 14/987,781, filed on Jan. 5, 2016, now Pat. No. 9,545,542, which is a
(Continued)

(51) Int. Cl.
*G08B 21/00* (2006.01)
*A63B 43/00* (2006.01)
(Continued)

(52) U.S. Cl.
CPC .......... *A63B 43/004* (2013.01); *A01K 15/025* (2013.01); *A63B 21/0055* (2015.10);
(Continued)

(58) Field of Classification Search
CPC ..... H02J 7/0068; A63B 43/06; A63B 71/0622
(Continued)

(56) References Cited

U.S. PATENT DOCUMENTS 2,020,484 A   11/1935   Turner
3,229,976 A    1/1966   Allen, Jr.
(Continued)

FOREIGN PATENT DOCUMENTS

GB    2213069         8/1989
WO    9930783 A1     6/1999
(Continued)

OTHER PUBLICATIONS

Data-sheet Dual Character with I. C. Driver LED alphanumeric display Part No. L TM-8647AC, Lite-On Electronics, Inc. publication BNS-OD-C131/A4 downloaded Mar. 2011 (7 pages).
(Continued)

*Primary Examiner* — Jeffery Hofsass
(74) *Attorney, Agent, or Firm* — May Patents Ltd.

(57) ABSTRACT

A device includes a signaling means and a motion sensor, and logic for activating or controlling the signaling means in response to a sensed motion according to an embedded logic. The device may be used as a toy, and may be shaped like a play ball or as a handheld unit. It may be powered from a battery, either chargeable from an AC power source directly or contactless by using induction or by converting electrical energy from harvested kinetic energy. The embedded logic may activate or control the signaling means, predictably or randomly, in response to sensed acceleration magnitude or direction, such as sensing the crossing of a preset threshold or sensing the peak value. The visual means may be a numeric display for displaying a value associated with the count of the number of times the threshold has been exceeded or the peak magnitude of the acceleration sensed.

61 Claims, 21 Drawing Sheets

Related U.S. Application Data continuation of application No. 14/301,544, filed on Jun. 11, 2014, which is a division of application No. 13/427,150, filed on Mar. 22, 2012, now abandoned.

(60) Provisional application No. 61/467,615, filed on Mar. 25, 2011.

(51) Int. Cl.

| | | |
|---|---|---|
| A63H 33/18 | (2006.01) | |
| A63B 43/06 | (2006.01) | |
| A63B 69/00 | (2006.01) | |
| G01P 1/08 | (2006.01) | |
| H02J 7/00 | (2006.01) | |
| H02J 7/02 | (2016.01) | |
| H02J 7/32 | (2006.01) | |
| G10H 1/26 | (2006.01) | |
| A63B 21/005 | (2006.01) | |
| G08B 5/36 | (2006.01) | |
| G08B 21/18 | (2006.01) | |
| A63H 5/00 | (2006.01) | |
| A63H 29/22 | (2006.01) | |
| A63H 29/24 | (2006.01) | |
| A63H 33/26 | (2006.01) | |
| G01P 15/18 | (2013.01) | |
| H02J 50/10 | (2016.01) | |
| A01K 15/02 | (2006.01) | |
| H02J 50/20 | (2016.01) | |
| A63B 71/06 | (2006.01) | |
| H02J 5/00 | (2016.01) | |

(52) U.S. Cl.
CPC .......... *A63B 43/06* (2013.01); *A63B 69/0053* (2013.01); *A63B 71/0622* (2013.01); *A63H 5/00* (2013.01); *A63H 29/22* (2013.01); *A63H 29/24* (2013.01); *A63H 33/18* (2013.01); *A63H 33/26* (2013.01); *G01P 1/08* (2013.01); *G01P 15/18* (2013.01); *G08B 5/36* (2013.01); *G08B 21/182* (2013.01); *G10H 1/26* (2013.01); *H02J 7/0063* (2013.01); *H02J 7/0068* (2013.01); *H02J 7/025* (2013.01); *H02J 7/027* (2013.01); *H02J 7/32* (2013.01); *H02J 50/10* (2016.02); *H02J 50/20* (2016.02); *A63B 2071/0602* (2013.01); *A63B 2071/063* (2013.01); *A63B 2071/0625* (2013.01); *A63B 2220/17* (2013.01); *A63B 2220/18* (2013.01); *A63B 2220/40* (2013.01); *A63B 2220/53* (2013.01); *A63B 2220/803* (2013.01); *A63B 2220/805* (2013.01); *A63B 2220/833* (2013.01); *A63B 2225/54* (2013.01); *G10H 2220/395* (2013.01); *G10H 2230/055* (2013.01); *H02J 5/005* (2013.01)

(58) Field of Classification Search
USPC ............ 340/669, 691.1, 384.1, 384.3, 384.6, 340/384.7; 446/409; 473/571
See application file for complete search history.

(56) References Cited

U.S. PATENT DOCUMENTS

| | | |
|---|---|---|
| 3,304,651 A | 2/1967 | Deyerl |
| 3,580,575 A | 5/1971 | Speeth |
| 3,586,870 A | 6/1971 | Cwiak |
| 3,683,216 A | 8/1972 | Post |
| 3,938,018 A | 2/1976 | Dahl |
| 4,031,449 A | 6/1977 | Trombly |
| 4,248,010 A | 2/1981 | Fox |
| 4,248,123 A | 2/1981 | Bunger et al. |
| 4,374,354 A | 2/1983 | Petrovic et al. |
| 4,408,151 A | 10/1983 | Justice |
| RE31,548 E | 4/1984 | Watanabe |
| 4,463,951 A | 8/1984 | Kumasaka et al. |
| 4,470,205 A | 9/1984 | Olivieri |
| 4,496,149 A | 1/1985 | Schwartzberg |
| 4,516,260 A | 5/1985 | Breedlove et al. |
| 4,542,902 A | 9/1985 | Massino |
| 4,561,661 A | 12/1985 | Walker et al. |
| 4,563,160 A | 1/1986 | Lee |
| 4,568,303 A | 2/1986 | Brown |
| 4,577,865 A | 3/1986 | Shishido |
| 4,586,456 A | 5/1986 | Forward |
| 4,595,200 A | 6/1986 | Shishido |
| 4,653,758 A | 3/1987 | Solheim |
| 4,660,831 A | 4/1987 | Kralik |
| 4,775,948 A | 10/1988 | Dial et al. |
| 4,776,589 A | 10/1988 | Yang |
| 4,796,891 A | 1/1989 | Milner |
| 4,801,141 A | 1/1989 | Rumsey |
| 4,806,440 A | 2/1989 | Hahs, Jr. et al. |
| 4,839,972 A | 6/1989 | Pack et al. |
| 4,840,602 A | 6/1989 | Rose |
| 4,853,884 A | 8/1989 | Brown et al. |
| 4,873,677 A | 10/1989 | Sakamoto et al. |
| 4,905,176 A | 2/1990 | Schulz |
| 4,927,401 A | 5/1990 | Sonesson |
| 4,940,236 A | 7/1990 | Allen |
| 4,942,352 A | 7/1990 | Sano |
| 4,968,255 A | 11/1990 | Lee et al. |
| 4,996,468 A | 2/1991 | Field et al. |
| 5,008,839 A | 4/1991 | Goodwin et al. |
| 5,054,785 A | 10/1991 | Gobush et al. |
| 5,066,011 A | 11/1991 | Dykstra et al. |
| 5,066,012 A | 11/1991 | Stark |
| 5,102,131 A | 4/1992 | Remington |
| 5,150,895 A | 9/1992 | Berger |
| 5,159,256 A | 10/1992 | Mattinger et al. |
| 5,228,686 A | 7/1993 | Maleyko |
| 5,228,705 A | 7/1993 | Merle-Smith |
| 5,236,383 A | 8/1993 | Connelly |
| 5,257,793 A | 11/1993 | Fortin |
| 5,277,993 A | 1/1994 | Landers |
| 5,297,981 A | 3/1994 | Maxim et al. |
| 5,329,274 A | 7/1994 | Donig et al. |
| 5,349,129 A | 9/1994 | Wisniewski et al. |
| 5,367,242 A | 11/1994 | Hulman |
| 5,375,839 A | 12/1994 | Pagani |
| 5,377,996 A | 1/1995 | Shure |
| 5,389,009 A | 2/1995 | Van Schenck, III |
| 5,396,538 A | 3/1995 | Hong |
| 5,423,549 A | 6/1995 | Englmeier |
| 5,435,579 A | 7/1995 | Pozzobon |
| 5,443,259 A | 8/1995 | Segan et al. |
| 5,447,314 A | 9/1995 | Yamazaki et al. |
| 5,480,144 A | 1/1996 | Downing |
| 5,490,047 A | 2/1996 | O'Rourke et al. |
| 5,492,329 A | 2/1996 | Kronin |
| 5,505,467 A | 4/1996 | Hill et al. |
| 5,533,920 A | 7/1996 | Arad |
| 5,536,979 A | 7/1996 | McEachern et al. |
| 5,550,452 A | 8/1996 | Shirai et al. |
| 5,564,702 A | 10/1996 | Meffert |
| 5,568,036 A | 10/1996 | Hulsey et al. |
| 5,578,755 A | 11/1996 | Offenberg |
| 5,578,877 A | 11/1996 | Tiemann |
| 5,582,550 A | 12/1996 | Foley |
| 5,600,225 A | 2/1997 | Goto |
| 5,618,023 A | 4/1997 | Eichholz et al. |
| 5,649,758 A | 7/1997 | Dion |
| 5,690,344 A | 11/1997 | Chen |
| 5,704,620 A | 1/1998 | Oliemans et al. |
| 5,722,046 A | 2/1998 | Serfaty et al. |
| 5,725,445 A | 3/1998 | Kennedy et al. |
| 5,741,195 A | 4/1998 | Sullivan et al. |
| 5,743,815 A | 4/1998 | Helderman |
| 5,755,634 A | 5/1998 | Huang |
| 5,761,096 A | 6/1998 | Zakutin |

(56) References Cited

U.S. PATENT DOCUMENTS

| | | |
|---|---|---|
| 5,764,134 A | 6/1998 | Carr et al. |
| 5,766,098 A | 6/1998 | Molitor et al. |
| 5,767,778 A | 6/1998 | Stone et al. |
| 5,779,574 A | 7/1998 | Allman et al. |
| 5,779,575 A | 7/1998 | Hsieh |
| 5,779,576 A | 7/1998 | Smith, III et al. |
| 5,807,197 A | 9/1998 | Grafton |
| 5,810,685 A | 9/1998 | Willner et al. |
| 5,842,706 A | 12/1998 | Chang |
| 5,924,942 A | 7/1999 | Gentile |
| 5,934,784 A | 8/1999 | Dion |
| 5,934,968 A | 8/1999 | Lin |
| 5,951,027 A | 9/1999 | Oyen et al. |
| 5,954,603 A | 9/1999 | Chursinoff |
| 5,957,470 A | 9/1999 | Powell |
| 5,962,786 A | 10/1999 | Le Traon et al. |
| 5,976,038 A | 11/1999 | Orenstein et al. |
| 6,012,995 A | 1/2000 | Martin |
| 6,042,487 A | 3/2000 | Schrimmer et al. |
| 6,082,744 A | 7/2000 | Allinger et al. |
| 6,113,504 A | 9/2000 | Kuesters |
| 6,117,030 A | 9/2000 | Green, Sr. |
| 6,132,281 A | 10/2000 | Klitsner et al. |
| 6,135,850 A | 10/2000 | Reed |
| 6,142,894 A | 11/2000 | Lee |
| 6,196,932 B1 | 3/2001 | Marsh et al. |
| 6,208,115 B1 | 3/2001 | Binder |
| 6,227,933 B1 | 5/2001 | Michaud et al. |
| 6,246,927 B1 | 6/2001 | Dratman |
| 6,251,035 B1 | 6/2001 | Fa |
| 6,257,995 B1 | 7/2001 | Schrimmer et al. |
| 6,280,278 B1 | 8/2001 | Wells |
| 6,287,225 B1 | 9/2001 | Touhey et al. |
| 6,299,553 B1 | 10/2001 | Petuchowski et al. |
| 6,375,580 B1 | 4/2002 | Schmidt et al. |
| 6,379,271 B1 | 4/2002 | Arnke |
| 6,409,618 B1 | 6/2002 | Touhey et al. |
| 6,422,960 B1 | 7/2002 | Touhey et al. |
| 6,450,906 B1 | 9/2002 | Touhey et al. |
| 6,458,008 B1 | 10/2002 | Hyneman |
| 6,459,955 B1 | 10/2002 | Bartsch et al. |
| 6,484,671 B2 | 11/2002 | Herrenbruck |
| 6,527,611 B2 | 3/2003 | Cummings |
| 6,537,125 B1 | 3/2003 | Motosko, III |
| 6,572,492 B2 | 6/2003 | Tinsman |
| 6,573,883 B1 | 6/2003 | Bartlett |
| 6,582,330 B1 | 6/2003 | Rehkemper et al. |
| 6,592,509 B1 | 7/2003 | Hunter, Jr. |
| 6,598,882 B2 | 7/2003 | Stubberfield |
| 6,615,109 B1 | 9/2003 | Matsuoka et al. |
| 6,666,782 B1 | 12/2003 | Wu |
| 6,670,212 B2 | 12/2003 | McNie et al. |
| 6,683,438 B2 | 1/2004 | Park et al. |
| 6,712,487 B2 | 3/2004 | Liou |
| 6,764,373 B1 | 7/2004 | Osawa et al. |
| 6,785,590 B2 | 8/2004 | Kasuga et al. |
| 6,786,795 B1 | 9/2004 | Mullaney et al. |
| 6,884,180 B2 | 4/2005 | Corzilius et al. |
| 6,906,495 B2 | 6/2005 | Cheng et al. |
| 6,917,182 B2 | 7/2005 | Burton et al. |
| 6,945,843 B1 | 9/2005 | Motosko |
| 6,945,887 B2 | 9/2005 | Oister et al. |
| 6,980,956 B1 | 12/2005 | Takagi et al. |
| 7,014,581 B2 | 3/2006 | Ng |
| 7,069,113 B2 | 6/2006 | Matsuoka et al. |
| 7,082,578 B1 | 7/2006 | Fishkin et al. |
| 7,091,863 B2 | 8/2006 | Ravet |
| 7,124,157 B2 | 10/2006 | Ikake |
| 7,130,741 B2 | 10/2006 | Bodin et al. |
| 7,145,933 B1 | 12/2006 | Szajnowski |
| 7,163,313 B2 | 1/2007 | Rosenberg |
| 7,170,047 B2 | 1/2007 | Pal |
| 7,173,604 B2 | 2/2007 | Marvit et al. |
| 7,179,181 B2 | 2/2007 | Ko |
| 7,258,591 B2 | 8/2007 | Xu et al. |
| 7,261,432 B1 | 8/2007 | Habitz |
| 7,297,045 B2 | 11/2007 | Pierson et al. |
| 7,326,866 B2 | 2/2008 | Kelley, Jr. et al. |
| 7,340,072 B2 | 3/2008 | Schaub |
| 7,340,077 B2 | 3/2008 | Gokturk et al. |
| 7,344,430 B2 | 3/2008 | Hasty et al. |
| 7,365,647 B2 | 4/2008 | Nativ |
| 7,367,232 B2 | 5/2008 | Vaganov et al. |
| 7,375,492 B2 | 5/2008 | Calhoon et al. |
| 7,378,817 B2 | 5/2008 | Calhoon et al. |
| 7,388,350 B1 | 6/2008 | Wright |
| 7,413,494 B2 | 8/2008 | Huang |
| 7,414,186 B2 | 8/2008 | Scarpa et al. |
| 7,414,380 B2 | 8/2008 | Tang et al. |
| 7,432,718 B2 | 10/2008 | Ishihara et al. |
| 7,507,498 B2 | 3/2009 | Yoon et al. |
| 7,525,283 B2 | 4/2009 | Cheng et al. |
| 7,526,362 B2 | 4/2009 | Kim et al. |
| 7,586,289 B2 | 9/2009 | Andruk et al. |
| 7,614,959 B1 | 11/2009 | Gentile |
| 7,617,729 B2 | 11/2009 | Axelrod et al. |
| 7,679,524 B2 | 3/2010 | Hofer et al. |
| 7,688,036 B2 | 3/2010 | Yarger et al. |
| 7,692,320 B2 | 4/2010 | Lemieux |
| 7,714,537 B2 | 5/2010 | Cheng et al. |
| 7,714,880 B2 | 5/2010 | Johnson |
| 7,716,985 B2 | 5/2010 | Zhang et al. |
| 7,723,958 B2 | 5/2010 | Darilek |
| 7,727,097 B2 | 6/2010 | Siegel et al. |
| 7,740,551 B2 | 6/2010 | Nurnberg et al. |
| 7,755,605 B2 | 7/2010 | Daniel et al. |
| 7,774,155 B2 | 8/2010 | Sato et al. |
| 7,786,696 B2 | 8/2010 | Kim et al. |
| 7,789,727 B2 | 9/2010 | Chernick et al. |
| 7,822,507 B2 | 10/2010 | Ishihara et al. |
| 7,832,362 B2 | 11/2010 | DeGhionno |
| 7,847,421 B2 | 12/2010 | Gardner et al. |
| 7,847,504 B2 | 12/2010 | Hollis |
| 7,850,535 B2 | 12/2010 | Noble et al. |
| 7,853,357 B2 | 12/2010 | Sawada et al. |
| 7,853,645 B2 | 12/2010 | Brown et al. |
| 7,854,669 B2 | 12/2010 | Marty et al. |
| 7,863,859 B2 | 1/2011 | Soar |
| 7,863,861 B2 | 1/2011 | Cheng et al. |
| 7,867,113 B2 | 1/2011 | Petersen |
| 7,872,445 B2 | 1/2011 | Hui |
| 7,876,067 B2 | 1/2011 | Greenfeld et al. |
| 7,891,666 B2 | 2/2011 | Kuenzler et al. |
| 7,892,876 B2 | 2/2011 | Mehregany |
| 7,906,936 B2 | 3/2011 | Azancot et al. |
| 7,927,253 B2 | 4/2011 | Vincent et al. |
| 7,948,208 B2 | 5/2011 | Partovi et al. |
| 7,952,322 B2 | 5/2011 | Partovi et al. |
| 7,952,324 B2 | 5/2011 | Cheng et al. |
| 7,979,162 B2 | 7/2011 | Niemela et al. |
| 8,022,775 B2 | 9/2011 | Julstrom et al. |
| 8,025,551 B2 | 9/2011 | Torres et al. |
| 8,038,504 B1 | 10/2011 | Wong |
| 8,055,310 B2 | 11/2011 | Beart et al. |
| 8,062,037 B1 | 11/2011 | Chapa, Jr. et al. |
| 8,093,864 B2 | 1/2012 | Wright |
| 8,099,189 B2 | 1/2012 | Kaznov et al. |
| 8,108,177 B2 | 1/2012 | Alexander |
| 8,111,041 B2 | 2/2012 | Onishi et al. |
| 8,126,675 B2 | 2/2012 | Vock et al. |
| 8,127,155 B2 | 2/2012 | Baarman et al. |
| 8,128,450 B2 | 3/2012 | Imai |
| 8,128,500 B1 | 3/2012 | Borst et al. |
| 8,142,287 B2 | 3/2012 | Podoloff |
| 8,169,185 B2 | 5/2012 | Partovi et al. |
| 8,172,722 B2 | 5/2012 | Molyneux et al. |
| 8,174,233 B2 | 5/2012 | Julstrom et al. |
| 8,174,234 B2 | 5/2012 | Julstrom et al. |
| 8,180,436 B2 | 5/2012 | Boyden et al. |
| 8,181,233 B2 | 5/2012 | Wyld |
| 8,187,126 B2 | 5/2012 | Martino |
| 8,188,706 B2 | 5/2012 | Yang |
| 8,196,550 B2 | 6/2012 | Levin et al. |
| 8,197,298 B2 | 6/2012 | Willett |

(56) References Cited

U.S. PATENT DOCUMENTS

| | | |
|---|---|---|
| 8,217,788 B2 | 7/2012 | Vock et al. |
| 8,221,290 B2 | 7/2012 | Vincent et al. |
| 8,228,056 B2 | 7/2012 | Bucher |
| 8,231,487 B2 | 7/2012 | Nurnberg et al. |
| 8,237,402 B2 | 8/2012 | Julstrom et al. |
| 8,239,146 B2 | 8/2012 | Vock et al. |
| 8,257,203 B2 | 9/2012 | Rasmussen |
| 8,258,917 B2 | 9/2012 | Cai et al. |
| 8,274,406 B2 | 9/2012 | Karlsson et al. |
| 8,275,544 B1 | 9/2012 | Wells et al. |
| 8,280,453 B2 | 10/2012 | Beart et al. |
| 8,280,681 B2 | 10/2012 | Vock et al. |
| 8,292,764 B2 | 10/2012 | Steidle |
| 8,310,201 B1 | 11/2012 | Wright |
| 8,326,469 B2 | 12/2012 | Phillips et al. |
| 8,330,639 B2 | 12/2012 | Wong et al. |
| 8,332,544 B1 | 12/2012 | Ralls et al. |
| 8,340,740 B2 | 12/2012 | Holzer et al. |
| 8,352,211 B2 | 1/2013 | Vock et al. |
| 8,352,643 B2 | 1/2013 | Birnbaum et al. |
| 8,355,297 B2 | 1/2013 | Wilbur et al. |
| 8,355,818 B2 | 1/2013 | Nielsen et al. |
| 8,360,904 B2 | 1/2013 | Oleson et al. |
| 8,364,136 B2 | 1/2013 | Hoffberg et al. |
| 8,367,235 B2 | 2/2013 | Huang |
| 8,371,971 B2 | 2/2013 | Bevier |
| 8,392,065 B2 | 3/2013 | Tolstedt et al. |
| 8,396,611 B2 | 3/2013 | Phillips et al. |
| 8,396,687 B2 | 3/2013 | Vock et al. |
| 8,417,384 B2 | 4/2013 | Togawa et al. |
| 8,428,904 B2 | 4/2013 | Vock et al. |
| 8,436,576 B2 | 5/2013 | Toya et al. |
| 8,456,298 B2 | 6/2013 | Valtonen |
| 8,460,816 B2 | 6/2013 | Julstrom et al. |
| 8,483,758 B2 | 7/2013 | Huang |
| 8,506,430 B2 | 8/2013 | Von Der Gruen et al. |
| 8,517,870 B2 | 8/2013 | Crowley et al. |
| 8,531,153 B2 | 9/2013 | Baarman et al. |
| 8,540,560 B2 | 9/2013 | Crowley et al. |
| 8,560,024 B2 | 10/2013 | Beart et al. |
| 8,571,781 B2 | 10/2013 | Bernstein et al. |
| 8,577,595 B2 | 11/2013 | Zhao et al. |
| 8,579,632 B2 | 11/2013 | Crowley |
| 8,597,095 B2 | 12/2013 | Crowley et al. |
| 8,610,400 B2 | 12/2013 | Stevens et al. |
| 8,620,600 B2 | 12/2013 | Vock et al. |
| 8,629,652 B2 | 1/2014 | Partovi et al. |
| 8,629,654 B2 | 1/2014 | Partovi et al. |
| 8,638,062 B2 | 1/2014 | Baarman et al. |
| 8,660,814 B2 | 2/2014 | Vock et al. |
| 8,668,602 B1 | 3/2014 | Kieffaber |
| 8,670,889 B2 | 3/2014 | Kaznov |
| 8,672,782 B2 | 3/2014 | Homsi et al. |
| 8,690,711 B2 | 4/2014 | Ko et al. |
| 8,693,293 B2 | 4/2014 | Wilbur et al. |
| 8,702,430 B2 | 4/2014 | Dibenedetto et al. |
| 8,758,172 B2 | 6/2014 | Creguer |
| 8,777,785 B2 | 7/2014 | Martino |
| 8,845,466 B2 | 9/2014 | Bevier |
| 8,864,609 B2 | 10/2014 | Kodama et al. |
| 8,890,470 B2 | 11/2014 | Partovi |
| 8,896,264 B2 | 11/2014 | Partovi |
| 8,901,881 B2 | 12/2014 | Partovi |
| 8,920,267 B2 | 12/2014 | Gable |
| 8,928,190 B2 | 1/2015 | Karren et al. |
| 8,947,047 B2 | 2/2015 | Partovi et al. |
| 8,951,106 B2 | 2/2015 | Crowley et al. |
| 8,951,151 B2 | 2/2015 | Glowinski |
| 8,954,117 B2 | 2/2015 | Huang |
| 8,970,166 B2 | 3/2015 | Hoffman et al. |
| 8,971,039 B2 | 3/2015 | Huang et al. |
| 8,992,353 B1 | 3/2015 | Kortegast |
| 9,026,187 B2 | 5/2015 | Huang |
| 9,077,013 B2 | 7/2015 | Huang et al. |
| 9,087,159 B2 | 7/2015 | Oleson et al. |
| 9,088,028 B2 | 7/2015 | Huang et al. |
| 9,088,029 B2 | 7/2015 | Huang et al. |
| 9,106,083 B2 | 8/2015 | Partovi |
| 9,112,362 B2 | 8/2015 | Partovi |
| 9,112,363 B2 | 8/2015 | Partovi |
| 9,112,364 B2 | 8/2015 | Partovi |
| 9,112,957 B2 | 8/2015 | Beart et al. |
| 9,123,935 B2 | 9/2015 | Huang |
| 9,137,309 B2 | 9/2015 | Ananny et al. |
| 9,143,003 B2 | 9/2015 | Baarman et al. |
| 9,153,985 B1 | 10/2015 | Gjovik et al. |
| 9,154,554 B2 | 10/2015 | Ananny et al. |
| 2001/0034279 A1 | 10/2001 | Veilleux et al. |
| 2002/0034991 A1 | 3/2002 | Sasaki et al. |
| 2002/0116147 A1 | 8/2002 | Vock |
| 2002/0187866 A1 | 12/2002 | Touhey et al. |
| 2003/0032507 A1 | 2/2003 | Lacroix et al. |
| 2003/0054905 A1 | 3/2003 | King, Jr. |
| 2003/0073518 A1 | 4/2003 | Marty et al. |
| 2003/0093182 A1 | 5/2003 | Yokoyama |
| 2003/0100391 A1 | 5/2003 | Kessler |
| 2003/0109339 A1 | 6/2003 | Oister |
| 2003/0125135 A1 | 7/2003 | Iwami et al. |
| 2003/0163287 A1 | 8/2003 | Vock |
| 2003/0199343 A1 | 10/2003 | Ilcisin et al. |
| 2003/0224885 A1 | 12/2003 | Leal et al. |
| 2004/0002284 A1 | 1/2004 | Leal |
| 2004/0002843 A1 | 1/2004 | Robarts et al. |
| 2004/0048686 A1 | 3/2004 | Thirkettle |
| 2004/0067411 A1 | 4/2004 | Lisanke |
| 2004/0105540 A1 | 6/2004 | Sayed |
| 2004/0162170 A1 | 8/2004 | Ng |
| 2004/0182614 A1 | 9/2004 | Wakui |
| 2004/0186623 A1 | 9/2004 | Dooley |
| 2004/0192163 A1 | 9/2004 | Siegel |
| 2005/0003885 A1 | 1/2005 | Rhoten |
| 2005/0004723 A1 | 1/2005 | Duggan et al. |
| 2005/0017677 A1 | 1/2005 | Burton et al. |
| 2005/0032457 A1 | 2/2005 | Gick |
| 2005/0064966 A1 | 3/2005 | Menow |
| 2005/0116683 A1 | 6/2005 | Cheng et al. |
| 2005/0156560 A1 | 7/2005 | Shimaoka et al. |
| 2005/0186884 A1 | 8/2005 | Evans |
| 2005/0223799 A1 | 10/2005 | Murphy |
| 2005/0226192 A1 | 10/2005 | Red et al. |
| 2005/0233815 A1 | 10/2005 | McCreary et al. |
| 2005/0259002 A1 | 11/2005 | Erario et al. |
| 2005/0264472 A1 | 12/2005 | Rast |
| 2005/0288133 A1 | 12/2005 | Rudell |
| 2006/0025254 A1 | 2/2006 | Myers |
| 2006/0046879 A1 | 3/2006 | Kelly et al. |
| 2006/0061325 A1 | 3/2006 | Tang et al. |
| 2006/0095158 A1 | 5/2006 | Lee et al. |
| 2006/0101465 A1 | 5/2006 | Kato et al. |
| 2006/0105857 A1 | 5/2006 | Stark |
| 2006/0108974 A1 | 5/2006 | Castillo |
| 2006/0135297 A1 | 6/2006 | Cruciani |
| 2006/0148594 A1 | 7/2006 | Saintoyant et al. |
| 2006/0167623 A1 | 7/2006 | Alexander |
| 2006/0167649 A1 | 7/2006 | Alexander |
| 2006/0183576 A1 | 8/2006 | Lindsey |
| 2006/0189386 A1 | 8/2006 | Rosenberg |
| 2006/0205381 A1 | 9/2006 | Beart et al. |
| 2006/0229040 A1 | 10/2006 | Hofer et al. |
| 2006/0241812 A1 | 10/2006 | Jung |
| 2006/0246345 A1 | 11/2006 | Yoon et al. |
| 2006/0267286 A1 | 11/2006 | Hickey |
| 2006/0271251 A1 | 11/2006 | Hopkins |
| 2007/0021244 A1 | 1/2007 | Ko |
| 2007/0026975 A1 | 2/2007 | Marty et al. |
| 2007/0034734 A1 | 2/2007 | Yoeli |
| 2007/0035093 A1 | 2/2007 | Fuchs |
| 2007/0037641 A1 | 2/2007 | Wong |
| 2007/0059675 A1 | 3/2007 | Kuenzler |
| 2007/0060425 A1 | 3/2007 | Kuenzler |
| 2007/0085706 A1 | 4/2007 | Feyereisen et al. |
| 2007/0112462 A1 | 5/2007 | Kim |
| 2007/0135243 A1 | 6/2007 | LaRue et al. |
| 2007/0156369 A1 | 7/2007 | Alexander |

(56) References Cited

U.S. PATENT DOCUMENTS

| | | |
|---|---|---|
| 2007/0157497 A1 | 7/2007 | Huang |
| 2007/0167266 A1 | 7/2007 | Devall |
| 2007/0178967 A1 | 8/2007 | Rosenberg |
| 2007/0182367 A1 | 8/2007 | Partovi |
| 2007/0191083 A1 | 8/2007 | Kuenzler |
| 2007/0210580 A1 | 9/2007 | Roberts et al. |
| 2007/0236183 A1 | 10/2007 | Darilek |
| 2007/0249422 A1 | 10/2007 | Podoloff |
| 2007/0256337 A1 | 11/2007 | Segan |
| 2007/0259592 A1 | 11/2007 | Imai |
| 2007/0273333 A1 | 11/2007 | Andruk et al. |
| 2007/0279002 A1 | 12/2007 | Partovi |
| 2007/0281811 A1 | 12/2007 | Wang |
| 2007/0282484 A1 | 12/2007 | Chung et al. |
| 2008/0009965 A1 | 1/2008 | Bruemmer et al. |
| 2008/0015058 A1 | 1/2008 | Noble et al. |
| 2008/0015061 A1 | 1/2008 | Klein |
| 2008/0015064 A1 | 1/2008 | Nelson et al. |
| 2008/0033641 A1 | 2/2008 | Medalia |
| 2008/0039246 A1 | 2/2008 | Martino |
| 2008/0039250 A1 | 2/2008 | Martino |
| 2008/0049372 A1 | 2/2008 | Loke |
| 2008/0054842 A1 | 3/2008 | Kim et al. |
| 2008/0077284 A1 | 3/2008 | Swope |
| 2008/0088303 A1 | 4/2008 | Englert |
| 2008/0121097 A1 | 5/2008 | Rudakevych et al. |
| 2008/0132363 A1 | 6/2008 | Harada |
| 2008/0174281 A1 | 7/2008 | Shau |
| 2008/0174448 A1 | 7/2008 | Hudson |
| 2008/0234077 A1 | 9/2008 | Glowinski |
| 2008/0240507 A1 | 10/2008 | Niwa et al. |
| 2008/0263628 A1 | 10/2008 | Norman et al. |
| 2008/0267450 A1 | 10/2008 | Sugimoto |
| 2008/0269949 A1 | 10/2008 | Norman et al. |
| 2008/0274844 A1 | 11/2008 | Ward |
| 2009/0004945 A1 | 1/2009 | Delassus |
| 2009/0029808 A1 | 1/2009 | Fore |
| 2009/0033623 A1 | 2/2009 | Lin |
| 2009/0042677 A1 | 2/2009 | Siegel et al. |
| 2009/0047645 A1 | 2/2009 | Dibenedetto et al. |
| 2009/0048039 A1 | 2/2009 | Holthouse et al. |
| 2009/0048044 A1 | 2/2009 | Oleson et al. |
| 2009/0055019 A1 | 2/2009 | Stiehl et al. |
| 2009/0057238 A1 | 3/2009 | Garti |
| 2009/0062033 A1 | 3/2009 | Harada |
| 2009/0068924 A1 | 3/2009 | Chernick et al. |
| 2009/0073034 A1 | 3/2009 | Lin |
| 2009/0081923 A1 | 3/2009 | Dooley et al. |
| 2009/0171516 A1 | 7/2009 | Reich |
| 2009/0176544 A1 | 7/2009 | Mertens |
| 2009/0191990 A1 | 7/2009 | Smith |
| 2009/0198371 A1 | 8/2009 | Emanuel et al. |
| 2009/0204261 A1 | 8/2009 | Strand et al. |
| 2009/0210078 A1 | 8/2009 | Crowley |
| 2009/0222148 A1 | 9/2009 | Knotts et al. |
| 2009/0226035 A1 | 9/2009 | Iihoshi et al. |
| 2009/0256822 A1 | 10/2009 | Amireh et al. |
| 2009/0262074 A1 | 10/2009 | Nasiri et al. |
| 2009/0265671 A1 | 10/2009 | Sachs et al. |
| 2009/0278932 A1 | 11/2009 | Yi |
| 2009/0284553 A1 | 11/2009 | Seydoux |
| 2009/0325739 A1 | 12/2009 | Gold |
| 2010/0004798 A1 | 1/2010 | Bodin et al. |
| 2010/0010669 A1 | 1/2010 | Lee et al. |
| 2010/0031424 A1 | 2/2010 | Sharpe et al. |
| 2010/0032224 A1 | 2/2010 | Liu |
| 2010/0063652 A1 | 3/2010 | Anderson |
| 2010/0066676 A1 | 3/2010 | Kramer et al. |
| 2010/0069181 A1 | 3/2010 | Lin |
| 2010/0084513 A1 | 4/2010 | Gariepy et al. |
| 2010/0106344 A1 | 4/2010 | Edwards et al. |
| 2010/0130314 A1 | 5/2010 | Von Der Gruen et al. |
| 2010/0130315 A1 | 5/2010 | Steidle |
| 2010/0145236 A1 | 6/2010 | Greenberg et al. |
| 2010/0169098 A1 | 7/2010 | Patch |
| 2010/0172287 A1 | 7/2010 | Krieter |
| 2010/0183195 A1 | 7/2010 | Sharma |
| 2010/0234993 A1 | 9/2010 | Seelinger et al. |
| 2010/0241289 A1 | 9/2010 | Sandberg |
| 2010/0261526 A1 | 10/2010 | Anderson et al. |
| 2010/0261562 A1 | 10/2010 | Bevier |
| 2010/0285909 A1 | 11/2010 | Voelker et al. |
| 2010/0305778 A1 | 12/2010 | Dorneich et al. |
| 2010/0305781 A1 | 12/2010 | Felix |
| 2010/0312917 A1 | 12/2010 | Allport |
| 2010/0313334 A1 | 12/2010 | Moy |
| 2010/0324753 A1 | 12/2010 | Okumatsu |
| 2011/0003640 A9 | 1/2011 | Ehrman |
| 2011/0012661 A1 | 1/2011 | Binder |
| 2011/0018731 A1 | 1/2011 | Linsky et al. |
| 2011/0018794 A1 | 1/2011 | Linsky et al. |
| 2011/0022196 A1 | 1/2011 | Linsky et al. |
| 2011/0031689 A1 | 2/2011 | Binder |
| 2011/0035054 A1 | 2/2011 | Gal et al. |
| 2011/0050940 A1 | 3/2011 | Lanz et al. |
| 2011/0060492 A1 | 3/2011 | Kaznov |
| 2011/0065488 A1 | 3/2011 | Okamura et al. |
| 2011/0071652 A1 | 3/2011 | Brown et al. |
| 2011/0071702 A1 | 3/2011 | Wang et al. |
| 2011/0077112 A1 | 3/2011 | Erario et al. |
| 2011/0082566 A1 | 4/2011 | Herr et al. |
| 2011/0087371 A1 | 4/2011 | Sandberg et al. |
| 2011/0118062 A1 | 5/2011 | Krysiak et al. |
| 2011/0118065 A1 | 5/2011 | Krysiak et al. |
| 2011/0119022 A1 | 5/2011 | Kuenzler et al. |
| 2011/0136596 A1 | 6/2011 | Rasmussen |
| 2011/0136603 A1 | 6/2011 | Lin et al. |
| 2011/0136604 A1 | 6/2011 | Hsu |
| 2011/0146775 A1 | 6/2011 | Kim et al. |
| 2011/0153885 A1 | 6/2011 | Mak et al. |
| 2011/0184590 A1 | 7/2011 | Duggan et al. |
| 2011/0205722 A1 | 8/2011 | Chen et al. |
| 2011/0213278 A1 | 9/2011 | Horak et al. |
| 2011/0214616 A1 | 9/2011 | Levin et al. |
| 2011/0234488 A1 | 9/2011 | Ge et al. |
| 2011/0237367 A1 | 9/2011 | Kodama |
| 2011/0241617 A1 | 10/2011 | Hoffman et al. |
| 2011/0250967 A1 | 10/2011 | Kulas |
| 2011/0285214 A1 | 11/2011 | Stevens et al. |
| 2011/0287878 A1 | 11/2011 | Englert |
| 2011/0291926 A1 | 12/2011 | Gokturk et al. |
| 2011/0313568 A1 | 12/2011 | Blackwell |
| 2011/0316529 A1 | 12/2011 | Stancil et al. |
| 2011/0320830 A1 | 12/2011 | Ito |
| 2012/0009845 A1 | 1/2012 | Schmelzer et al. |
| 2012/0035799 A1 | 2/2012 | Ehrmann |
| 2012/0058845 A1 | 3/2012 | Crowley et al. |
| 2012/0065747 A1 | 3/2012 | Brown et al. |
| 2012/0083945 A1 | 4/2012 | Oakley et al. |
| 2012/0083962 A1 | 4/2012 | Sato et al. |
| 2012/0106783 A1 | 5/2012 | Chang et al. |
| 2012/0146775 A1 | 6/2012 | Kudo et al. |
| 2012/0149359 A1 | 6/2012 | Huang |
| 2012/0152790 A1 | 6/2012 | Houvener et al. |
| 2012/0157246 A1 | 6/2012 | Glover et al. |
| 2012/0167014 A1 | 6/2012 | Joo et al. |
| 2012/0168240 A1 | 7/2012 | Wilson et al. |
| 2012/0173018 A1 | 7/2012 | Allen et al. |
| 2012/0173047 A1 | 7/2012 | Bernstein |
| 2012/0173049 A1 | 7/2012 | Bernstein et al. |
| 2012/0173050 A1 | 7/2012 | Bernstein et al. |
| 2012/0181981 A1 | 7/2012 | Wechlin et al. |
| 2012/0185115 A1 | 7/2012 | Dean |
| 2012/0193154 A1 | 8/2012 | Wellborn et al. |
| 2012/0197439 A1 | 8/2012 | Wang et al. |
| 2012/0215355 A1 | 8/2012 | Bewley et al. |
| 2012/0231906 A1 | 9/2012 | Barry et al. |
| 2012/0244969 A1 | 9/2012 | Binder |
| 2012/0295740 A1 | 11/2012 | Creguer |
| 2012/0298049 A1 | 11/2012 | Cook et al. |
| 2012/0298430 A1 | 11/2012 | Schroll et al. |
| 2012/0306850 A1 | 12/2012 | Balan et al. |
| 2012/0307001 A1 | 12/2012 | Osako et al. |
| 2012/0309261 A1 | 12/2012 | Boman et al. |

(56) References Cited

U.S. PATENT DOCUMENTS

| | | | |
|---|---|---|---|
| 2012/0311810 | A1 | 12/2012 | Gilbert, Jr. et al. |
| 2013/0023365 | A1 | 1/2013 | Idoni-Matthews et al. |
| 2013/0050069 | A1 | 2/2013 | Ota |
| 2013/0065482 | A1 | 3/2013 | Trickett |
| 2013/0095959 | A1 | 4/2013 | Marty et al. |
| 2013/0109272 | A1 | 5/2013 | Rindlisbacher |
| 2013/0109511 | A1 | 5/2013 | Galyuk |
| 2013/0115847 | A1 | 5/2013 | Gable |
| 2013/0130843 | A1 | 5/2013 | Burroughs et al. |
| 2013/0130848 | A1 | 5/2013 | Homsi et al. |
| 2013/0143482 | A1 | 6/2013 | Regler |
| 2013/0167290 | A1 | 7/2013 | Ben Ezra |
| 2013/0265225 | A1 | 10/2013 | Nasiri et al. |
| 2013/0274040 | A1 | 10/2013 | Coza et al. |
| 2014/0171226 | A1 | 6/2014 | Costain et al. |
| 2014/0309059 | A1 | 10/2014 | Minch |
| 2014/0371954 | A1 | 12/2014 | Lee et al. |

FOREIGN PATENT DOCUMENTS

| | | |
|---|---|---|
| WO | 9959684 A1 | 11/1999 |
| WO | 03096512 A2 | 11/2003 |
| WO | 2005002327 A2 | 6/2004 |
| WO | 2005002327 A3 | 6/2004 |
| WO | 2008015465 A1 | 2/2008 |

OTHER PUBLICATIONS

Data-sheet PF226-04 EPSON 7910 series 'Multi-Melody IC' Seiko-Epson Corporation, Electronic Devices Marketing Division dated 1998 (4 pages).

Data-sheet YMF721 OPL4-ML2 FM + Wavetable Synthesizer LSI, Yamaha Corporation Catalog No. LSI-4MF721A20, Jul. 10, 1997 (41 pages).

Data-sheet "General Purpose Timers", Maxim Integrated Products, Inc. publication No. 19-0481 Rev.2 11/92, 1992, (9 pages).

Data-sheet Quadruple digits, seven-segments, LED display Part No. L TC-361 OG, Lite-On Electronics, Inc. publication BNS-OD-C131/A4 downloaded Mar. 2011 (5 pages).

Partial International Search of PCT/182012/052618 dated Feb. 11, 2013.

Data-sheet Rev. 1.00 Holtek Semiconductor Inc. HT3834 CMOS VLSI Integrated Circuit (IC) '36 Melody Music Generator' dated Nov. 2, 2006 (16 pages).

User's Manual Revision 1.0 Magnevation LLC Magnevation SpeakJet chip 'Natural Speech & Complex Sound Synthesizer' Jul. 27, 2004 (17 pages).

Data-sheet UM3481 Bowin Electronic Company Hong-Kong, 'UM3481 Series-UM3481 A Multi-Instrument Melody Generator' REV.6-03 (4 pages).

Data-sheet LS 13561C Bowin Electronic Company Hong-Kong, LSI-LS1356 '4 Digit Time with Colon Default' Version 1.2 (Oct. 24, 2003) (6 pages).

Data-sheet ML2215 FEDL2215-01 OKI Semiconductor 'Speech synthesizer plus Music LSI with On-Chip 3 Mbit Mask ROM' May 2001 (26 pages).

Data-sheet LIS302DL STMicroelectronics N.V., 'MEMS motion sensor 3-axis– ±2g/±8g smart digital output "piccolo"accelerometer', Rev. 4, Oct. 2008 (42 pages).

Data-sheet SQ-SEN-200 SignaiQuest, Inc., 'Datasheet SQ-SEN-200 Omnidirectional Tilt and Vibration Sensor' Updated Aug. 3, 2009 (6 pages).

Data Book OPTi 82C931 'Plug and Play Integrated Audio Controller', No. 912-3000-035 Revision: 2.1 published on Aug. 1, 1997 (64 pages).

Data-sheet 'True Random Number Generation IC RPG1 00 I RPG1 OOB', FDK Corporation No. HM-RAE001-0509, Last update Sep. 2005 (4 pages).

Integrated-Circuits Application-Note AN170 'NE555 and NE556 applications', Philips Semiconductors, Dec. 1988 (19 pages).

Data-sheet "General Purpose Timers", Maxim Integrated Products, Inc. publication No. 19-0481 Rev.2 Nov. 1992 (8 pages).

Data-sheet Multi Color LED Part No. 08L5015RGBC, Electronix Express I RSR Electronics, downloaded Mar. 2011 (2 pages).

Data-sheet Pulse Counters, electronic, LCD Module 192, Fritz Kubler GmbH catalog p. 77 Jun. 2009 (1 page).

Data-sheet Pulse Counters, electronic, LCD Pulse Counters—Codix 130, Fritz Kubler GmbH catalog pp. 56-57 Feb. 2011 (2 pages).

Data-sheet Programmable Single-/Dual-/Triple-Tone Gong, SAE 800, Siemens semiconductor Group, Sep. 1994 (15 pages).

MOTION SENSING DEVICE WHICH PROVIDES A VISUAL INDICATION WITH A WIRELESS SIGNAL

FIELD OF THE INVENTION

The present invention relates generally to an apparatus and method including a motion sensing and an annunciator responding to the sensed motion, and more particularly, to a toy or any other amusing device including a motion sensor and an annunciator.

BACKGROUND OF THE INVENTION

A ball is a round, generally spherical shaped object, but sometimes ovoid, with various uses. In a ball game, the play of the game follows the state of the ball as it is hit, kicked or thrown by players. Ball can also be used for simpler activities, such as catch, marbles and juggling. Simple balls are commonly formed of flexible plastic material, while others use synthetic leather. Various ball games are known for amusement, sport and other recreation activities, are played with a ball or balls, and are subject to rules, such as cricket, baseball, basketball, football, soccer, tennis, rugby, golf, volleyball and others. Examples of balls used in game balls are illustrated in FIG. 1, showing a soccer (a.k.a. football outside of the U.S.) ball 1, commonly consisting of twelve regular pentagonal and twenty regular hexagonal panels positioned in a truncated icosahedron spherical geometry, and made up of a latex bladder which enables the football to be pressurized. A basketball ball 2 is shown as a sphere shaped inflated ball used in the game of basketball. A ball 3 is used in volleyball is a spherical, made of leather or synthetic leather ball, having a circumference of 65-67 cm and a weight of 260-280 grams. A prolate spheroid ('egg-shaped') ball 4 is used in U.S. football game, and a golf ball 5 is used for the game of golf. Tennis balls such as ball 6 are commonly covered in a fibrous fluffy felt which modifies their aerodynamic properties. Examples of golf balls are described in U.S. Pat. No. 4,653,758 to Solheim, U.S. Pat. No. 5,766,098 to Molitor et al., U.S. Patent Application Publication 2002/0034991 to Sasaki et al. and U.S. Patent Application Publication 2003/0125135 to Iwami, all titled: "Golf Ball" and incorporated in their entirety for all purposes as if fully set forth herein.

One example of a prior-art pet toy that comprises a ball that has an opening and an exit and used for treat dispensing, having sound recording and playback is described in U.S. Pat. No. 6,484,671 to Herrenbruck titled: "Treat Dispensing Toy", which is incorporated in its entirety for all purposes as if fully set forth herein. Another prior-art food dispensing treat pet toy is described in U.S. Pat. No. 7,832,362 to DeGhionno titles: "Lightweight, Hollow, Reusable, Food-Dispensing Treat Toy and Combination of Food-Dispensing Treat Toy with an Enclosing Container Designed for Intellectual Stimulation, Enrichment and Amusement of Animals, and Reduction of Boredom or Separation Anxiety That May Lead to Destructive or Undesirable Behavior in Puppies and/or Other Animals", which is incorporated in its entirety for all purposes as if fully set forth herein. An impact sensitive talking ball including a plunger that operates a test switch when the ball is squeezed in described in U.S. Pat. No. 5,375,839 to Pagani titled: "Impact Sensitive Talking Ball", which is incorporated in its entirety for all purposes as if fully set forth herein. A game ball with a timer or clock is described in U.S. Pat. No. 6,945,887 to Oister et al. titled: "Game Ball with Clock", which is incorporated in its entirety for all purposes as if fully set forth herein.

In consideration of the foregoing, it would be an advancement in the art to provide a method and system that is simple, cost-effective, faithful, reliable, has a minimum part count, minimum hardware, or uses existing and available components for providing additional amusement, education, entertainment and a better user experience relating to a device such as a ball game, toy and the like, preferably without departing from the conventional 'look and feel' of a common toy or ball. Further, it would be advantageous if such a toy or ball provides added educational value and stimulus for playing, adding to the user experience more curiosity and excitement, as well as added pleasure and amusement and making the toy more versatile and attractive to play with, while being easy to construct and manufacture, robust and consistent in aesthetic appearance and function, and preferably without significantly departing from the conventional 'look and feel' of such a toy or a ball.

SUMMARY OF THE INVENTION

In one aspect of the invention, a device for signaling in response to a sensed motion is described. The device may be housed in a single enclosure, and may include an accelerometer for sensing the device acceleration, an annunciator for signaling to a person or an animal using visual or audible signaling, and a controller coupled between the accelerometer and the annunciator for activating or controlling the annunciator in response to the sensed device acceleration according to a predetermined logic. A power source is included that may power the electrical components such as the accelerometer, the annunciator, the controller and any other power-consuming components. Each of the annunciator, the power source, the accelerometer, the controller and other of the device components may be mechanically attached to the enclosure.

The power source may include a primary or a rechargeable battery housed in a battery compartment secured in the device enclosure. The battery compartment may be accessed for replacing the battery via an opening in the enclosure, by removing a securely removable cover, which may be having a perforated front surface covering a mating aperture being flush with the surface surrounding the aperture. A power connector on the external surface of the enclosure may be used for connecting to a power source or for charging the battery using a battery charger. The charging may use a DC power from a domestic AC power outlet providing AC powering, using an AC/DC adapter comprising a step-down transformer and an AC/DC converter. In one aspect of the invention, the device is powered from a generator that converts the kinetic energy of the device to an electrical energy, such as by using a coil and a magnetic field, which their relative movement is generated in response to the device motion. The device may be powered or charged contactlessly using induction. In this case, the device further includes an induction coil for wirelessly receiving AC power and charging the rechargeable battery when the device is put in an electromagnetic field.

The accelerometer may be piezoelectric, piezoresistive, capacitive, MEMS or electromechanical switch accelerometer, measuring the magnitude and the direction the device acceleration in a single-axis, 2-axis or 3-axis (omnidirectional).

The device may include one or more annunciators. Each annunciator may be a visual or an audible signaling component (or both), operated or controlled by the controller. An annunciator may further contain a smoke generator.

The visual signaling component may contain a visible light emitter based on a semiconductor device (e.g. LED—Light Emitting Diode), an incandescent lamp or a fluorescent lamp. The illumination may be blinking or steady, and can further be used to illuminate part of or all of an image. The visible light emitter positioning, appearance, type, color or steadiness may be associated with the device theme or device shape. The visible light emitter may be a numerical or an alphanumerical display, capable of displaying numbers, letters, symbols, words or characters, which may be displayed as scrolling, static, bold or flashing. The visible light emitter may be a video or image display and may be based on LCD (Liquid Crystal Display), TFT (Thin-Film Transistor), FED (Field Emission Display) or CRT (Cathode Ray Tube).

The audible signaling device may be based on electromechanical or piezoelectric means capable of generating single or multiple tones, and can be a buzzer, a chime or a ringer. In one aspect of the invention, the audible signaling device comprising a loudspeaker and a digital to analog converter coupled to the loudspeaker. The volume, type, steadiness, pitch, rhythm, dynamics, timbre or texture of the sound emitted from the audible signaling device may be associated with the device theme or the device shape. Alternatively, the sound emitted from the audible signaling device is a song or a melody, wherein the song or melody name or content relates to the device theme or shape. In one aspect, the sound emitted from the audible signaling device is a human voice talking sounding of a syllable, a word, a phrase, a sentence, a short story or a long story, using speech synthesis or being pre-recorded.

In one aspect of the invention, the annunciator can be in one out of two states, and wherein the annunciator state is in response to an event defined by the sensed acceleration magnitude or direction exceeding a predefined value. An annunciator state may involve activating it by supplying power from the power supply via a switch, while the other state involves deactivating it by disconnecting the power supply. The control logic is operative to shift the annunciator between states until the next event occurs or for a predetermined period in response to an event or in response to a preset number of events. Further, the annunciator may toggle between states in response to an event or to a preset number of events. The annunciator may also continuously toggle between states, wherein the period in each state, the toggling frequency, the toggling period or the duty-cycle is affected as a response to an event or in response to the number of counted events. Alternatively or in addition, the annunciator may be in one out of a multiple states in response to an event. The annunciator may include multiple components, and the annunciator states may be defined as activating or powering a selected one (or more) of its components. In response to an event or multiple events, the annunciator state may shift between states according to a predictable or random order.

In one aspect of the invention, the controller is used to activate (or deactivate) or control the annunciator based on the sensed motion measured by the accelerometer. The control may use controlling the annunciator powering or via a dedicated control port of the annunciator. The controller may be based on a discrete logic or an integrated device, such as a processor, microprocessor or microcomputer, and may include a general-purpose device or may be a special purpose processing device, such as an ASIC, PAL, PLA, PLD, Field Programmable Gate Array (FPGA), Gate Array, or other customized or programmable device, and may includes a memory that may include a static RAM (random Access Memory), dynamic RAM, flash memory, ROM (Read Only Memory), or any other data storage medium. The memory may include data, programs, and/or instructions and any other software or firmware executable by the processor. The control logic can be implemented in hardware or in software, such as a firmware stored in the memory.

In one aspect, the annunciator activation or control use randomness using a random signal generator. The random signal generator may be based on a digital random signal generator having a digital output. Alternatively, the random signal generator may be based on analog random signal generator having an analog output. Analog random signal generator may use a digital random signal generator whose output is converted to analog using analog to digital converter, or can use a repetitive analog signal generator (substantially not synchronized to any other timing in the system) whose output is randomly time sampled by a sample and hold. A random signal generator (having either analog or digital output) can be hardware based, using a physical process such as thermal noise, shot noise, nuclear decaying radiation, photoelectric effect or other quantum phenomena, or can be software based, using a processor executing an algorithm for generating pseudo-random numbers which approximates the properties of random numbers.

The device may be substantially sphere shaped similar to play ball, and may be used as a toy for the amusement of a person or a pet. The ball shape may be similar to cricket, baseball, basketball, football, soccer, tennis, rugby, golf, or volleyball play ball. Alternatively, the device may be shaped as a handheld unit including two disks attached to both ends of a rod.

The activation or control of the annunciator may be as a response to the combination of the direction or the magnitude of the sensed acceleration, or a combination thereof. One or multiple acceleration thresholds may be defined, and the device may be operative to activate or control the annunciator as a response to the magnitude of the sensed acceleration exceeding one or more of the acceleration thresholds. The device may further comprise a counter, such as an electromechanical counter, mechanical counter, hardware counter or software-based counter, for counting events for counting the times that the magnitude of the sensed acceleration exceeds an acceleration threshold, and according to the counter value to activate or control the annunciator. The annunciator may be a numerical display for displaying a representation of the counter value, or a loudspeaker for saying a representation of the counter value. The device may further comprise a peak-detector and a storage for detecting and storing a peak value of the sensed acceleration, and the annunciator may be activated or controlled according to the measured peak value. The annunciator may be a numerical display for displaying a representation of the peak value, or a loudspeaker for saying a representation of the peak value.

In one aspect, the motion sensor detects or measure the tilt angle of the device and the acceleration along the tilt angle, and the annunciator is activated or controlled in response to the sensed tilt angle value and the sensed acceleration magnitude in the tilt axis. The device may further operative the annunciator where one parameter of the annunciator is activated or controlled in response to the sensed tilt angle value, while another parameter of the annunciator is activated or controlled in response to the acceleration magnitude in the tilt axis. The annunciator may include an audible signaling component where either the sensed tilt angle value or the sensed acceleration magnitude in the tilt axis affects one or more of the volume, type, frequency, steadiness, pitch, rhythm, dynamics, timbre or texture of the sound emitted from the audible signaling component. Further, the emitted sound may resemble or accurately be the sound of a musical instrument such as drums, piano, tuba, harp, violin, flute or guitar.

The above summary is not an exhaustive list of all aspects of the present invention. Indeed, the inventor contemplates that his invention includes all systems and methods that can be practiced from all suitable combinations and derivatives of the various aspects summarized above, as well as those disclosed in the detailed description below and particularly pointed out in the claims filed with the application. Such combinations have particular advantages not specifically recited in the above summary.

It is understood that other embodiments of the present invention will become readily apparent to those skilled in the art from the following detailed description, wherein are shown and described only embodiments of the invention by way of illustration. As will be realized, the invention is capable of other and different embodiments and its several details are capable of modification in various other respects, all without departing from the scope of the present invention as defined by the claims. Accordingly, the drawings and detailed description are to be regarded as illustrative in nature and not as restrictive.

The above and other features and advantages of the present invention will become more fully apparent from the following description, drawings and appended claims, or may be learned by the practice of the invention as set forth hereinafter. It is intended that all such additional apparatus and advantages be included within this description, be within the scope of the present invention, and be protected by the accompanying claims.

The preferred embodiments of the invention presented here are described below in the drawings and the detailed specification. Unless specifically noted, it is intended that the words and phrases in the specification and the claims be given the plain, ordinary and accustomed meaning to those of ordinary skill in the applicable arts. If any other special meaning is intended for any word or phrase, the specification will clearly state and define the special meaning.

BRIEF DESCRIPTION OF THE FIGURES

The invention is herein described, by way of non-limiting examples only, with reference to the accompanying figures and drawings, wherein like designations denote like elements. Understanding that these drawings only provide information concerning typical embodiments of the invention and are not therefore to be considered limiting in scope.

DETAILED DESCRIPTION OF EMBODIMENTS

Figure 1:
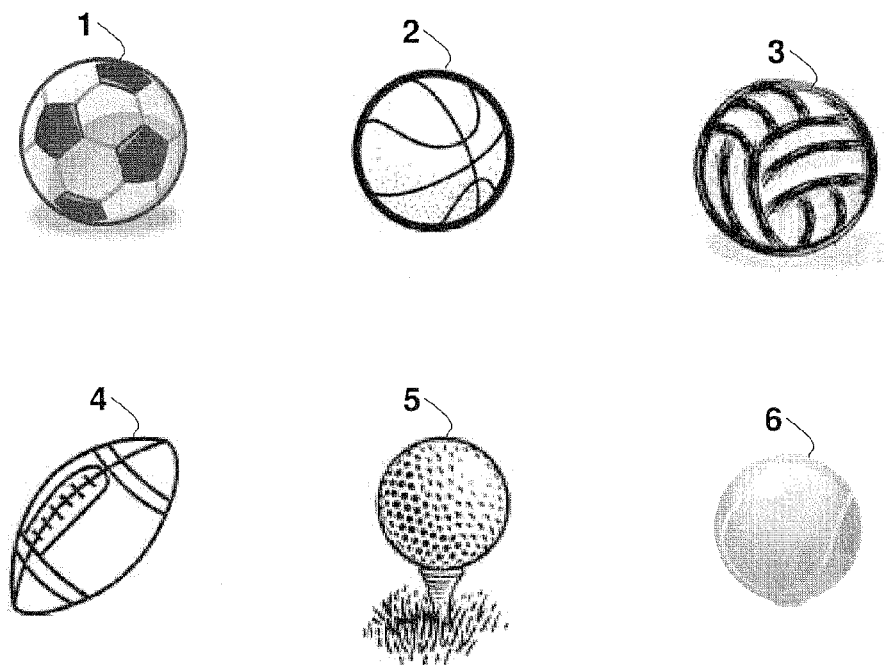
FIG. 1 depicts various shapes of game balls.

The principles and operation of an apparatus according to the present invention may be understood with reference to the figures and the accompanying description wherein similar components appearing in different figures are denoted by identical reference numerals. The drawings and descriptions are conceptual only. In actual practice, a single component can implement one or more functions; alternatively, each function can be implemented by a plurality of components and devices. In the figures and descriptions, identical reference numerals indicate those components that are common to different embodiments or configurations. Identical numerical references (even in the case of using a different suffix, such as 5, 5a, 5b and 5c) refer to functions or actual devices that are either identical, substantially similar, or having similar functionality. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in the figures herein, is not intended to limit the scope of the invention, as claimed, but is merely representative of embodiments of the invention.

Unless specifically stated otherwise, as apparent from the following discussions, it is appreciated that throughout the specification discussions, utilizing terms such as "processing", "computing", "calculating", "determining", "generating", "creating" or the like, refer to the action and/or processes of a computer or computing system, or processor or similar electronic computing device, that manipulate and/or transform data represented as physical, such as electronic, quantities within the computing system's registers and/or memories into other data, similarly represented as physical quantities within the computing system's memories, registers or other such information storage, transmission or display devices.

Embodiments of the present invention may use terms such as processor, computer, apparatus, system, sub-system, module, unit and/or device (in single or plural form) for performing the operations herein. This may be specially constructed for the desired purpose, or it may comprise a general purpose computer selectively activated or reconfigured by a computer program stored in the computer. Such a computer program may be stored in a computer readable storage medium such as, but not limited to, any type of disk including, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes/devices (or counterpart terms specified above) and displays presented herein are not inherently related to any particular computer or other apparatus, unless specifically stated otherwise. Various general purpose systems may be used with programs in accordance with the teachings herein, or it may prove convenient to construct a more specialized apparatus to perform the desired method. The desired structure for a variety of these systems will appear in the description below. In addition, embodiments of the present invention are not described with reference to any particular programming language. It will be appreciated that a variety of programming languages may be used to implement the teachings of the inventions as described herein.

All directional references used herein (e.g., upper, lower, upwards, downwards, left, right, leftward, rightward, top, bottom, above, below, vertical, horizontal, clockwise, and counterclockwise, etc.) are only used for identification purposes to aid the reader's understanding of the present invention, and do not create limitations, particularly as to the position, orientation, or use of the invention.

While the devices herein are described as connected using wires or conductors, any type of conductive transmission line can be equally used. The terms 'wire', 'conductor', 'line', 'transmission line', 'cable', 'wiring', 'wire pair' as used herein should be interpreted to include any type of conductive transmission-line, and specifically a metallic transmission line comprising two or more conductors used to carry electrical signals. Non-limiting examples are coaxial cable, PCB (Printed Circuit Board) connections and twisted pair, the latter including both UTP (Unshielded Twisted-Pair) and STP (shielded twisted-pair), as well as connections within Application Specific Integrated Circuits (ASICs). Similarly, any PAN (Personal Area Network), LAN (Local Area Network), MAN (Metropolitan Area Network) or WAN (Wide Area Network) wiring may be used as the wired medium.

Figure 2:
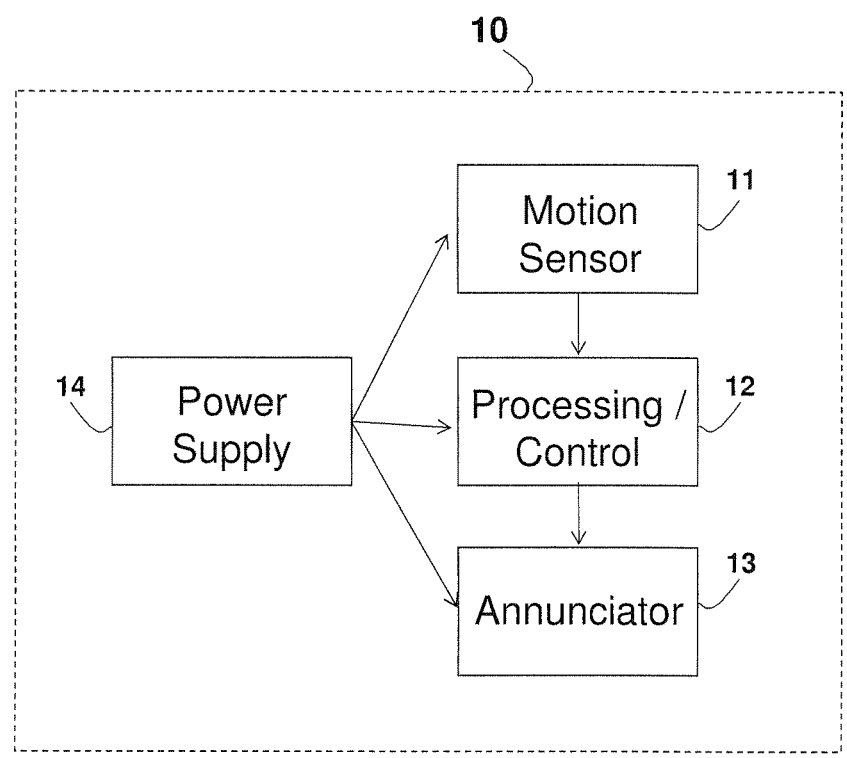
FIG. 2 illustrates an electrical schematic block diagram of a device according to one aspect of the invention.
Figure 2A:
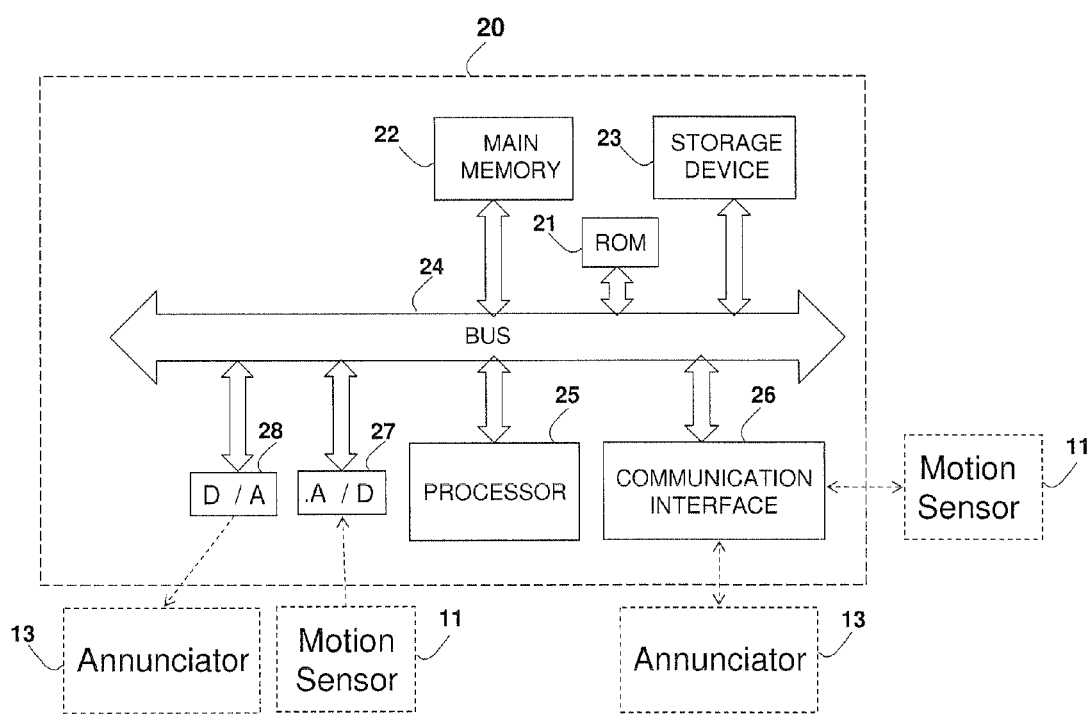
FIG. 2a illustrates an electrical schematic block diagram of a processor-based control block according to one aspect of the invention.

A device 10 according to one aspect of the invention is described in FIG. 2. The device 10 includes a motion sensor 11, feeding the sensed motion information to a processing/control block 12, which operates annunciator 13 in response to the motion sensed by the motion sensor 11. The device is power fed from a power supply 14. The motion sensor 11 detects and measures the change in position of the device 10 with respect to time. The motion sensor 10 may include one or more accelerometers, which measures the absolute acceleration or the acceleration relative to freefall. For example, one single-axis accelerometer per axis may be used, requiring three such accelerometers for three-axis sensing. The motion sensor 11 may be a single or multi-axis sensor, detecting the magnitude and direction of the acceleration as a vector quantity, and thus can be used to sense orientation, acceleration, vibration, shock and falling. The motion sensor 11 output may be analog or digital signals, representing the measured values.

The motion sensor 11 may be based on a piezoelectric accelerometer that utilizes the piezoelectric effect of certain materials to measure dynamic changes in mechanical variables (e.g., acceleration, vibration, and mechanical shock). Piezoelectric accelerometers commonly rely on piezoceramics (e.g., lead zirconate titanate) or single crystals (e.g., quartz, tourmaline). Piezoelectric quartz accelerometer is disclosed in U.S. Pat. No. 7,716,985 to Zhang et al. entitled: "Piezoelectric Quartz Accelerometer", U.S. Pat. No. 5,578,755 to Offenberg entitled: "Accelerometer Sensor of Crystalline Material and Method for Manufacturing the Same" and U.S. Pat. No. 5,962,786 to Le Traon et al. entitled: "Monolithic Accelerometric Transducer", which are all incorporated in their entirety for all purposes as if fully set forth herein. Alternatively or in addition, the motion sensor 11 may be based on the Micro Electro-Mechanical Systems (MEMS, a.k.a. Micro-mechanical electrical systems) technology. A MEMS based motion sensor is disclosed in U.S. Pat. No. 7,617,729 to Axelrod et al. entitled: "Accelerometer", U.S. Pat. No. 6,670,212 to McNie et al. entitled: "Micro-Machining" and in U.S. Pat. No. 7,892,876 to Mehregany entitled: "Three-axis Accelerometers and Fabrication Methods", which are all incorporated in their entirety for all purposes as if fully set forth herein. An example of MEMS motion sensor is LIS302DL manufactured by STMicroelectronics NV and described in Data-sheet LIS302DL STMicroelectronics NV, 'MEMS motion sensor 3-axis-±2 g/±8 g smart digital output "piccolo" accelerometer', Rev. 4, October 2008, which is incorporated in its entirety for all purposes as if fully set forth herein.

Alternatively or in addition, the motion sensor 11 may be based on electrical tilt and vibration switch or any other electromechanical switch, such as the sensor described in U.S. Pat. No. 7,326,866 to Whitmore et al. entitled: "Omnidirectional Tilt and vibration sensor", which is incorporated in its entirety for all purposes as if fully set forth herein. An example of an electromechanical switch is SQ-SEN-200 available from SignalQuest, Inc. of Lebanon, N.H., USA, described in the data-sheet 'DATASHEET SQ-SEN-200 Omnidirectional Tilt and Vibration Sensor' Updated 2009 Aug. 3, which is incorporated in its entirety for all purposes as if fully set forth herein. Other types of motion sensors may be equally used, such as devices based on piezoelectric, piezoresistive and capacitive components to convert the mechanical motion into an electrical signal. Using an accelerometer to control is disclosed in U.S. Pat. No. 7,774,155 to Sato et al. entitled: "Accelerometer-Based Controller", which is incorporated in its entirety for all purposes as if fully set forth herein.

The annunciator 13 may include one or more visual or audible signaling components, or any other devices that indicates a status to the person. In one embodiment according to the invention, the annunciator 13 includes a visual signaling device. In one example, the device illuminates a visible light, such as a Light-Emitting-Diode (LED), or uses a Liquid Crystal Display (LCD) which uses changes in the reflectivity in an applied electric field. The LED may be a multi-color LED, such as LED Part No. 08L5015RGBC available from RSR Electronics, Inc. from NJ, U.S.A., described in Data-sheet Multi Color LED Part No. 08L5015RGBC, which is incorporated in its entirety for all purposes as if fully set forth herein. However, any type of visible electric light emitter such as a flashlight, an incandescent lamp and compact fluorescent lamps can be used. Multiple light emitters may be used, and the illumination may be steady, blinking or flashing, either independently or under the control of the control block 12. Further, the illumination can be directed for lighting a surface, such as a surface including an image or a picture. Further, a single single-state visual indicator may be used to provide multiple indications, for example by using different colors (of the same visual indicator), different intensity levels, variable duty-cycle and so forth. Further, the visual signaling may be associated with the device 10 function, theme or shape. Such conceptual relationship may include, for example, the light emitters' brightness, appearance, location, type, color and steadiness that are influenced by the device 10 theme, providing a surprising and illustrative result. In one example, the annunciator 13 is based on a numerical digital display that provides readings in the form of numbers. For example, the annunciator 13 may use the quadruple digits, seven-segments, LED display Part No.: LTC-3610G available from Lite-On Electronics, Inc., and described in Lite-On Electronics, Inc., Publication BNS-OD-C131/A4 downloaded March 2011, which is incorporated in its entirety for all purposes as if fully set forth herein. Similarly, the annunciator 13 is based on an alphanumerical digital display that provides readings in the form of characters, including numbers, letters or symbols. For example, the annunciator 13 may use the quadruple digits, seven-segments, LED display Part No.: LTM-8647AC available from Lite-On Electronics, Inc., and described in Lite-On Electronics, Inc., Publication BNS-OD-C131/A4 downloaded March 2011, which is incorporated in its entirety for all purposes as if fully set forth herein.

The invention can be similarly used to display word messages in a variety of fashions and formats, such as scrolling, static, bold and flashing. The device 10 can further display visual display material beyond words and characters, such as arrows, symbols, ASCII and non-ASCII characters, still images such as pictures and video. The annunciator 13 may use any electronic display or any other output device used for presentation of visual information. The display may be a digital or analog video display, and may use technologies such as LCD (Liquid Crystal Display), TFT (Thin-Film Transistor), FED (Field Emission Display), CRT (Cathode Ray Tube) or any other electronic screen technology that visually shows information such as graphics or text. In many cases, an adaptor (not shown) is required in order to connect an analog display to the digital data. For example, the adaptor may convert to composite video (PAL, NTSC) or S-Video or HDTV signal. Analog displays are commonly using interfaces such as composite video such as NTSC, PAL or SECAM formats. Similarly, analog RGB, VGA (Video Graphics Array), SVGA (Super Video Graphics Array), SCART, S-video and other standard analog interfaces can be used. Further, personal computer monitors, plasma or flat panel displays, CRT, DLP display or a video projector may be equally used. Standard digital interfaces such as an IEEE1394 interface, also known as FireWire™, may be used. Other digital interfaces that can be used are USB, SDI (Serial Digital Interface), FireWire, HDMI (High-Definition Multimedia Interface), DVI (Digital Visual Interface), UDI (Unified Display Interface), DisplayPort, Digital Component Video and DVB (Digital Video Broadcast).

In one example, the device is used for sound or music generation, such as a music toy instrument. The sensed motion may be associated with a musical tune (or a tone) or any other single sound, which is played upon activation of the music-associated annunciator 13. A timbre sound element may also be used to select the timbre or other tonal characteristics of the output sounds. The sign of the musical tune to be played by the device 10 is printed, engraved or labeled on the device external surface. Further, the sound produced by an annunciator can emulate the sounds of a conventional acoustical music instruments, such as a piano, tuba, harp, violin, flute, guitar and so forth. Further, the device 10 can be shaped as a miniature of the music instrument associated with its sound.

In one embodiment according to the invention, the annunciator includes an audible signaling device, emitting audible sounds that can be heard (having frequency components in the 20-20,000 Hz band). In one example, the device is a buzzer (or beeper), a chime, a whistler or a ringer. Buzzers are known in the art and are either electromechanical or ceramic-based piezoelectric sounders which make a high-pitch noise. The sounder may emit a single or multiple tones, and can be in continuous or intermittent operation. In another example, the sounder simulates the voice of a human being or generates music, typically by using an electronic circuit having a memory for storing the sounds (e.g., click, gong, music, song, voice message, etc.), a digital to analog converter to reconstruct the electrical representation of the sound and driver for driving a loudspeaker, which is an electro-acoustical transducer that converts an electrical signal to sound. An example of a greeting card providing music and mechanical movement is disclosed in U.S. Patent Application 2007/0256337 to Segan entitled: "User Interactive Greeting Card", which is incorporated in its entirety for all purposes as if fully set forth herein. A 'Gong' sound may be generated using SAE 800 from Siemens, described in Data-sheet Programmable Single-/Dual-/Triple-Tone Gong, SAE 800, Siemens semiconductor Group, 02.05, ", which is incorporated in its entirety for all purposes as if fully set forth herein.

The audible signaling may be associated with the motion sensed by the device 10, as well as its theme or shape. For example, the sounder appearance, as well as the sound volume, type and steadiness may be influenced by the theme, providing a surprising and illustrative result. For example, the shape may include household appliance associated with a specific sound such as the ringing of a telephone set, the buzzer of the entrance bell or the bell sound or a microwave oven. Other examples are a horn of an automobile, the rattling 'chik-chuk' sound of a train and a siren of an emergency vehicle such as a police car, an ambulance or a fire-engine truck. In such a case, the sounder will preferably generate a sound which simulates or is similar to the real sound associated with the theme, such as a telephone ringing for a telephone set and a siren sound for a police car. In another example, the device shape includes an animal, and the sounder produces the characteristic sound of the animal, such as barking for a dog, yowling for a cat and twittering of a bird. Such a system can be used for audio-visual learning for teaching small children by association of an object such as a musical instruments or an animal which produces a distinctive sound with the viewable indicia associated therewith.

In one example the sound generated is music or song. The elements of the music such as pitch (which governs melody and harmony), rhythm (and its associated concepts tempo, meter, and articulation), dynamics, and the sonic qualities of timbre and texture, may be associated with the device 10 shape or theme. For example, if a musical instrument shown in a picture or by the shape of the device 10, the music generated by that instrument will be played, such as drumming sound of drums and playing of a flute or guitar. In one example according to the invention, a song or a melody of a song is played by the annunciator. Preferably, the song (or its melody) may be associated with the device 10 sensed motions, its shape or its theme.

In one example according to the invention, a human voice talking is played by the annunciator. The sound may be a syllable, a word, a phrase, a sentence, a short story or a long story, and can be based on speech synthesis or pre-recorded. Male or female voice can be used, being young or old. The text sounded is preferably associated with the shape or theme. For example, a name of the theme of the system can be heard, such as 'dog', 'truck' and 'mountain'. Further, the story heard may be related to the theme, or can describe the items shown in an image printed on the device 10 enclosure. In another example, general encouraging, thanking or praising phrases can be made such as 'good work', 'excellent' and 'congratulations'. Further, a greeting such as 'Merry Christmas' can be played for a Christmas related theme.

A tone, voice, melody or song sounder typically contains a memory storing a digital representation of the pre-recorder or synthesized voice or music, a digital to analog (D/A) converter for creating an analog signal, a speaker and a driver for feeding the speaker. An annunciator 13, which includes a sounder, may be based on Holtek HT3834 CMOS VLSI Integrated Circuit (IC) named '36 Melody Music Generator' available from Holtek Semiconductor Inc., headquartered in Hsinchu, Taiwan, and described with application circuits in a data sheet Rev. 1.00 dated Nov. 2, 2006, which is incorporated in their entirety for all purposes as if fully set forth herein. Similarly, the sounder may be based on EPSON 7910 series 'Multi-Melody IC' available from Seiko-Epson Corporation, Electronic Devices Marketing Division located in Tokyo, Japan, and described with application circuits in a data sheet PF226-04 dated 1998, which is incorporated in its entirety for all purposes as if fully set forth herein. A human voice synthesizer may be based on Magnevation SpeakJet chip available from Magnevation LLC and described in 'Natural Speech & Complex Sound Synthesizer' described in User's Manual Revision 1.0 Jul. 27, 2004, which is incorporated in its entirety for all purposes as if fully set forth herein. A general audio controller may be based on OPTi 82C931 'Plug and Play Integrated Audio Controller' described in Data Book 912-3000-035 Revision: 2.1 published on Aug. 1, 1997, which is incorporated in its entirety for all purposes as if fully set forth herein. Similarly, a music synthesizer may be based on YMF721 OPL4-ML2 FM+Wavetable Synthesizer LSI available from Yamaha Corporation described in YMF721 Catalog No. LSI-4MF721A20, which is incorporated in its entirety for all purposes as if fully set forth herein.

Some examples of prior-art toys that include generation of an audio signal such as music are disclosed in U.S. Pat. No. 4,496,149 to Schwartzberg entitled: "Game Apparatus Utilizing Controllable Audio Signals", in U.S. Pat. No. 4,516,260 to Breedlove et al. entitled: "Electronic Learning Aid or Game having Synthesized Speech", in U.S. Pat. No. 7,414,186 to Scarpa et al. entitled: "System and Method for Teaching Musical Notes", in U.S. Pat. No. 4,968,255 to Lee et al. entitled: "Electronic Instructional Apparatus", in U.S. Pat. No. 4,248,123 to Bunger et al. entitled: "Electronic Piano" and in U.S. Pat. No. 4,796,891 to Milner entitled: "Musical Puzzle Using Sliding Tiles", and toys with means for synthesizing human voice are disclosed in U.S. Pat. No. 6,527,611 to Cummings entitled: "Place and Find Toy", and in U.S. Pat. No. 4,840,602 to Rose entitled: "Talking Doll Responsive to External Signal", which are all incorporated in their entirety for all purposes as if fully set forth herein. A music toy kit combining music toy instrument with a set of construction toy blocks is disclosed in U.S. Pat. No. 6,132,281 to Klitsner et al. entitled: "Music Toy Kit" and in U.S. Pat. No. 5,349,129 to Wisniewski et al. entitled: "Electronic Sound Generating Toy", which are incorporated in their entirety for all purposes as if fully set forth herein.

In one example according to the invention, the annunciator includes a smoke generation unit, mimicking the generation of a real life smoking such as a smoke of a real train. Preferably, such implementation may relate to a theme of a train having a smoking locomotive or a fire. Some examples of smoke generation units are disclosed in U.S. Pat. No. 6,280,278 to Wells entitled: "Smoke Generation System for Model Top Applications" and U.S. Pat. No. 7,297,045 to Pierson et al. entitled: "Smart Smoke Unit", which are all incorporated in their entirety for all purposes as if fully set forth herein.

The device 10 is powered from a power supply 14 connected to electrically power part or all of the power-consuming components of the device 10. The power supply 14 may be a power source which is integrated into the device 10 enclosure, such as a battery, either primary or rechargeable type, which may reside in a battery compartment. Alternatively, the power source may reside external to the device enclosure and is feeding the local power supply 14, such as powering from AC power outlet via common AC/DC adapter containing a step-down transformer and an AC to DC converter (rectifier). A DC/DC converter may be used in order to adapt the power voltage from a source into one or more voltages used by the various electrical circuits.

The battery may be a primary or a rechargeable (secondary) type, may include a single or few batteries, and may use various chemicals for the electro-chemical cells, such as lithium, alkaline and nickel-cadmium. Common batteries are manufactured in defined output voltages (1.5, 3, 4.5, 9 Volts, for example), as well as defined standard mechanical enclosures (usually defined by letters "A", "AA", "B", "C" sizes etc., and 'coin' type). In one embodiment the battery (or batteries) is held in a battery holder, and thus can be easily replaced.

As an alternative or as addition to using battery as a power source, the system can be power fed from the AC power supply, and thus may include an AC/DC converter, for converting the AC power (commonly 115 VAC/60 Hz in North America and 220 VAC/50 Hz in Europe) into the required DC voltage or voltages. Such small outlet plug-in step-down transformer shape can be used (also known as wall-wart, "power brick", "plug pack", "plug-in adapter", "adapter block", "domestic mains adapter", "power adapter", or AC adapter) as known in the art and typically involves converting 120 or 240 volt AC supplied by a power utility company to a well-regulated lower voltage DC for electronic devices. The AC adapters commonly include a step down transformer for reducing to non-hazardous potential such as 12V or 9V, connected to a DC rectifier to supply a DC voltage (such as 12 VDC or 9 VDC).

The control block 12 receives the signals representing the magnitude and the direction of the motion sensed by the motion sensor 11, and controls the operation of the annunciator 13 based on a logic embedded in it. The annunciator 13 may be operated based on the magnitude of the sensed motion, such as a threshold mechanism activating the annunciator when the motion sensed exceeds a pre-defined value. In another example, the annunciator is activated in response to the value measured. Similarly, the logic in the control block 12 may also activate the annunciator in response to the direction of the motion sensed by the motion sensor 11. Further, the logic may involve any combination of magnitude and direction of the sensed motion.

The control block 12 embedded logic may also use the timing information relating to the motion, such as the change of the magnitude and/or the direction of the motion over time. For example, a timer may be used for measuring the time between successive hits. Further, a timer may be used in order to activate (or de-activate) an annunciator for a defined period as a response to an event such as sensing an acceleration magnitude exceeding a predefined threshold. Timing information may use timers that may be implemented as a monostable circuit, producing a pulse of set length when triggered. In one example, the timers are based on RC based popular timers such as 555 and 556, such as ICM7555 available from Maxim Integrated Products, Inc. of Sunnyvale, Calif., U.S.A., described in the data sheet "General Purpose Timers" publication number 19-0481 Rev.2 November 1992, which is incorporated in its entirety for all purposes as if fully set forth herein. Examples of general timing diagrams as well as monostable circuits are described in Application Note AN170 "NE555 and NE556 Applications" from Philips semiconductors dated December 1988, which is incorporated in its entirety for all purposes as if fully set forth herein. Alternatively, a passive or active delay line may be used. Further, a processor based delay line can be used, wherein the delay is set by its firmware.

The control block 12 electronic circuits (e.g., integrated circuit (IC) and related devices) may be based on a discrete logic or an integrated device, such as a processor, microprocessor or microcomputer, and may include a general-purpose device or may be a special purpose processing device, such as an Application-Specific Integrated Circuit (ASIC), PAL, Programmable Logic Array (PLA), Programmable Logic Device (PLD), Field Programmable Gate Array (FPGA), Gate Array, or other customized or programmable device. For example, a timer can be implemented by a counted loop executed in software. In the case of a programmable device as well as in other implementations, a memory is required. The memory may include a static RAM (random Access Memory), dynamic RAM, flash memory, ROM (Read Only Memory), or any other data storage medium. The memory may include data, algorithms, programs, and/or instructions and any other software or firmware executable by the processor. The control logic can be implemented in hardware or in software, such as a firmware stored in the memory. The term "processor" herein is meant to include any integrated circuit or other electronic device (or collection of devices) capable of performing an operation on at least one instruction including, without limitation, reduced instruction set core (RISC) processors, CISC microprocessors, microcontroller units (MCUs), CISC-based central processing units (CPUs), and digital signal processors (DSPs). The hardware of such devices may be integrated onto a single substrate (e.g., silicon "die"), or distributed among two or more substrates. Furthermore, various functional aspects of the processor may be implemented solely as software or firmware associated with the processor. In accordance with various embodiments of the present disclosure, the methods described herein may be implemented by software programs executable by a processor or a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any one or more of a computer-readable medium or a distribution medium and other equivalents and successor media, in which data or instructions may be stored.

Common forms of computer-readable media include, for example, a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read.

FIG. 2 is a block diagram that illustrates a processor-based control block 20 upon which an embodiment of a control block 12 may be implemented. The control block 20 may be integrated or used as a portable electronic device such as notebook/laptop computer, a media player (e.g., MP3 based or video player), a cellular phone, a Personal Digital Assistant (PDA), an image processing device (e.g., a digital camera or video recorder), and/or any other handheld computing devices, or a combination of any of these devices. Note that while FIG. 2 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention. The computer system of FIG. 2 may, for example, be an Apple Macintosh computer or Power Book, or an IBM compatible PC. Computer/control/logic system 20 includes a bus 24, an interconnect, or other communication mechanism for communicating information, and a processor (or a Central Processing Unit—CPU) 25, commonly in the form of an integrated circuit, coupled with bus 24 for processing information and for executing the computer executable instructions. Computer/logic/control system 20 also includes a main memory 22, such as a Random Access Memory (RAM) or other dynamic storage device, coupled to bus 24 for storing information and instructions to be executed by processor 25. Main memory 22 also may be used for storing temporary variables or other intermediate information during execution of instructions to be executed by processor 25. Computer/control/logic system 20 further includes a Read Only Memory (ROM) 21 (or other non-volatile memory) or other static storage device coupled to bus 24 for storing static information and instructions for processor 25. A storage device 23, such as a magnetic disk or optical disk, a hard disk drive for reading from and writing to a hard disk, a magnetic disk drive for reading from and writing to a magnetic disk, and/or an optical disk drive (such as DVD) for reading from and writing to a removable optical disk, is coupled to bus 24 for storing information and instructions. The hard disk drive, magnetic disk drive, and optical disk drive may be connected to the system bus by a hard disk drive interface, a magnetic disk drive interface, and an optical disk drive interface, respectively. The drives and their associated computer-readable media provide non-volatile storage of computer readable instructions, data structures, program modules and other data for the general purpose computing devices. Typically computer system 20 includes an operating system (OS) stored in a non-volatile storage for managing the computer resources and provides the applications and programs with an access to the computer resources and interfaces. An operating system commonly processes system data and user input, and responds by allocating and managing tasks and internal system resources, such as controlling and allocating memory, prioritizing system requests, controlling input and output devices, facilitating networking and managing files. Examples of operating systems are Microsoft Windows, Mac OS X, and Linux.

The invention is related to the use of computer/control/logic system 20 for implementing the methods and techniques described herein. According to one embodiment of the invention, those methods and techniques are performed by computer/control/logic system 20 in response to processor 25 executing one or more sequences of one or more instructions contained in main memory 22. Such instructions may be read into main memory 22 from another computer-readable medium, such as storage device 23. Execution of the sequences of instructions contained in main memory 22 causes processor 25 to perform the process steps described herein. In alternative embodiments, hard-wired circuitry may be used in place of or in combination with software instructions to implement the invention. Thus, embodiments of the invention are not limited to any specific combination of hardware circuitry and software.

The control system 20 may communicate with the motion sensor 11 and the annunciator 13 via a digital communication link using Communication Interface 26 coupled to bus 24. In the case of a motion sensor 11 having an analog output, an Analog-to-Digital (A/D) converter 27 which converts continuous signals to discrete digital numbers is used, coupled between the motion sensor 11 and the bus 24. In the case the annunciator 13 is having an analog input, a Digital-to-Analog (D/A) converter 28 which converts a digital (usually binary) code to an analog signal (current, voltage or electric charge) coupled between the annunciator 13 and the bus 24. Other signal conditioning may also be applied in order to improve the handling of the motion sensor output or to adapt to control or activate the annunciator, such as attenuation, delay, filtering, amplifying, digitizing and any other signal manipulation.

The term 'random' in these specifications and claims is intended to cover not only pure random, non-deterministically and non-predicted generated signals, but also pseudo-random, deterministic signals such as the output of a shift-register arrangement provided with a feedback circuit as used to generate pseudo-random binary signals or as scramblers, and chaotic signals. In one aspect of the invention, a randomness factor is included in the device. The stochastic operation may add amusement and recreation to the system or device operation since the operation will be surprising, non-repetitive and cannot be predicted.

In one aspect of the invention randomness may be used. Randomness is commonly implemented by using random numbers, defined as a sequence of numbers or symbols that lack any pattern and thus appear random, are often generated by a random number generator. A random number generator (having either analog or digital output) can be hardware based, using a physical process such as thermal noise, shot noise, nuclear decaying radiation, photoelectric effect or other quantum phenomena. Alternatively, or in addition, the generation of the random numbers can be software based, using a processor executing an algorithm for generating pseudo-random numbers which approximates the properties of random numbers.

A digital random signal generator (known as random number generator) wherein numbers in binary form replaces the analog voltage value output may be used. One approach to random number generation is based on using linear feedback shift registers. An example of random number generators is disclosed in U.S. Pat. No. 7,124,157 to Ikake entitled: "Random Number Generator", in U.S. Pat. No. 4,905,176 to Schulz entitled: "Random Number Generator Circuit", in U.S. Pat. No. 4,853,884 to Brown et al. entitled: "Random Number Generator with Digital Feedback" and in U.S. Pat. No. 7,145,933 to Szajnowski entitled: "Method and Apparatus for generating Random signals", which are incorporated in its entirety for all purposes as if fully set forth herein.

A digital random signal generator can be based on 'True Random Number Generation IC RPG100/RPG100B' available from FDK Corporation and described in the data sheet 'Physical Random number generator RPG100.RPG100B' REV. 08 publication number HM-RAE106-0812, which is incorporated in its entirety for all purposes as if fully set forth herein. The digital random signal generator can be hardware based, generating random numbers from a natural physical process or phenomenon, such as the thermal noise of semiconductor which has no periodicity. Typically, such hardware random number generators are based on microscopic phenomena such as thermal noise, shot noise, nuclear decaying radiation, photoelectric effect or other quantum phenomena, and typically contain a transducer to convert some aspect of the physical phenomenon to an electrical signal, an amplifier and other electronic to bring the output into a signal that can be converted into a digital representation by an analog to digital converter. In the case where digitized serial random number signals are generated, the output is converted to parallel, such as 8 bits data, with 256 values of random numbers (values from 0 to 255). Alternatively, the digital random signal generator 582 can be software (or firmware) based, such as pseudo-random number generators. Such generators include a processor for executing software that includes an algorithm for generating numbers, which approximates the properties of random numbers.

The random signal generator (either analog or digital) may output a signal having uniform distribution, in which there is a substantially or purely equal probability of a signal falling between two defined limits, having no appearance outside these limits. However, Gaussian and other distribution may be equally used.

Figure 3:
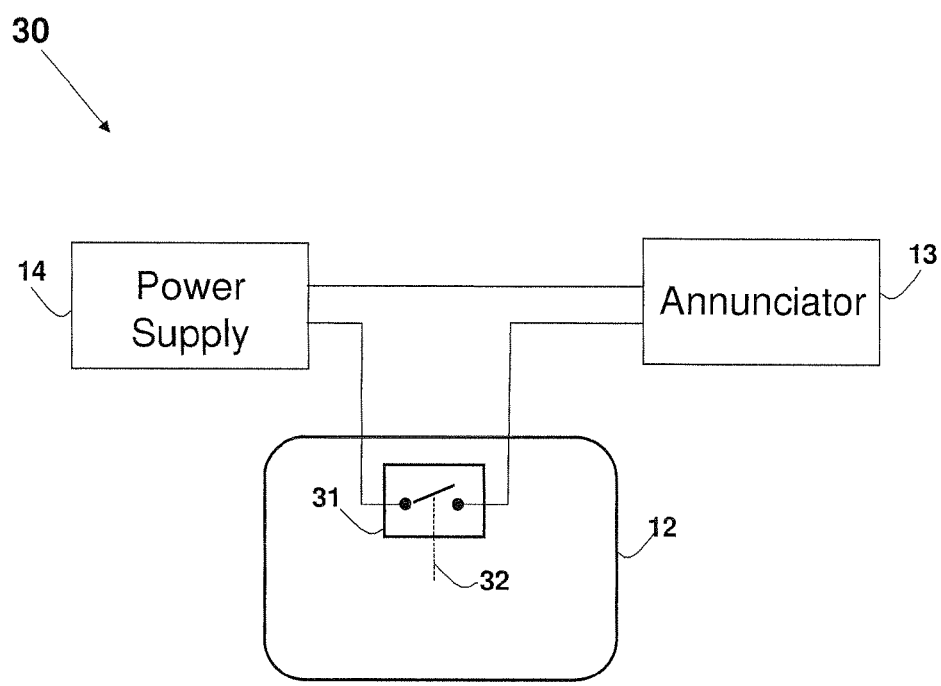
FIG. 3 illustrates an electrical schematic block diagram of activating an annunciator according to one aspect of the invention.

The annunciator 13 may be powered from the same power supply 14 as the one powering the associated device, or may be powered from a dedicated or separated power source. In one example, the annunciator 13 activation may include its powering by the power supply 14 by a switch connected between a power supply 14 and the annunciator 13, where the switch is activated based on the activation signal. Such a scheme is exampled in a device 30 shown in FIG. 3, describing a logic block 12 including an electrically activated switch 31, operated via a control port 32, connected between the power supply 14 and the annunciator 13. The logic in the control block 12 activates the switch 31 via the control port 32, which in turn power the annunciator 13 from the power supply 14. In one embodiment, the annunciator 13 is toggle controlled, wherein each triggering event causes the annunciator 13 to switch to an alternate state, for example by using a toggle switch as an alternative or as an addition to the on/off switch 31. The switch 31 may be implemented by relay contacts, wherein control line 32 is a control signal used to energize and de-energize the coil of the relay, or may be implemented using solid state circuitry such as a solid-state relay, an optocoupler or any other controlled switches known in the art.

The control block 12 uses control port 32 for selectively energizing and de-energizing the annunciator 13 via the switch 31. For a non-limiting example, in the case wherein the annunciator 13 is a LED (or any other illuminating device), the control block 12 logic may turn the light on or off via the control port 32. Similarly, a flashing light can be obtained by periodically providing the power to the LED by the control block 12. Similarly, in the case wherein annunciator 13 is a buzzer, the continuity, duty-cycle and time of operation can be controlled by the control block 12. In some cases controlling the annunciator 13 is not made via switching its power but rather by a control port, preferably digital, provided in the annunciator 13. Examples of control blocks, annunciators and means and methods for controlling or activating payloads such as an annunciator are described in U.S. Patent Application Publication 2011/0012661 to Binder titled: "Sequentially Operated Modules" and in U.S. Patent Application Publication 2011/0031689 to Binder titled: "Puzzle with Conductive Path", both are incorporated in their entirety for all purposes as if fully set forth herein.

In one example, a 'hit' of the device 10 is detected by sensing any acceleration above a pre-defined magnitude. For example, the threshold value is determined such as to sense throwing, kicking or catching of the ball 10. In such a case, the logic 12 (or the motion sensor 11) is set to detect any acceleration in any direction which is above 2 g. The annunciator 13 is responsive to such sensed 'hit'. In one case, the annunciator has two states, activated ('ON') and deactivated ('OFF'), such as a lamp having 'lit' and 'blank' states or a buzzer having 'silent' and 'buzz' states. In such a case, the annunciator 13 may be activated for a pre-defined time (e.g. 2 seconds) any time a 'hit' is detected. Alternatively, the annunciator 13 changes states between 'ON' and 'OFF' each time a hit is sensed, such that it is activated only after odd number of hits, and stays deactivated after even numbers of hits. In another example, the annunciator 13 is responsive to the number of hits detected, for example during a defined period or counted as long as pre-set time period between hits has not expired. In such example, the annunciator 13 is activated only after pre-set number of hits. For example, the annunciator 13 enters 'ON' state only after 10 hits were detected in a 15 seconds period. Alternatively, the annunciator 13 enters 'ON' state after 10 hits, wherein the measured time between successive hits is less than 4 seconds.

The annunciator 13 may annunciate by cycling between 'ON' and 'OFF' states (such as lamp flashing), where the annunciator 13 is activated intermittently few times for a short duration each time, where either the activating rate or the number of 'ON' periods are based on the sensed motion. Preferably, during such activation the period of time of the 'ON' state is equal to the period of the 'OFF' state. For example, the annunciator 13 may flash according to the number of sensed hits in a pre-defined period, or as long as hits are being sensed, or the number of sensed hits is accumulated and stored, and shown as the numbers of short activations after a pre-set rest period (when no hits are sensed during that period). Similarly, the annunciator 13 is activated in response to the magnitude of a sensed hit. For example, a strong hit, such as sensed by high magnitude of acceleration, will affect the number of the cycles, where a hit of 10 g may result in 10 activation cycles, and a hit of 5 g will create a response of 5 cycles. In such a case, the logic block 12 may include few thresholds at different acceleration magnitude levels, where crossing higher threshold will result in more number of blinks. Alternatively or in addition, the hits count or the hit magnitude may be used to change the rate of the annunciator 13 cycling, where higher hits count or stronger hit will affect higher frequency or duty-cycle.

While the operation of the annunciator 13 has been described above as having two states, non-activated ('OFF' state) and activated ('ON' state), the annunciator 13 activation or control may also be continuous level control such as changing the illumination intensity in a lamp, where changing of the light energy or power emitted, or the sounding volume of a buzzer or any other sounder. In such configuration, the annunciator 13 level control is based on the motion sensed by the motion sensor 11. For example, the level may be increased at each hit sensed or based on the number of hits sensed in a defined period. Similarly, the annunciator 13 level may reflect the strength of the hit sensed by measuring the peak of the acceleration magnitude. The changing level may be combined with the number of cycles, the duty cycle or any other activation scheme of the annunciator 13.

In one example, the annunciator 13 can be in one out of multiple states as controlled by the logic block 12. For example, the annunciator 13 may be a multi-color LED, where one of the colors is illuminating under a control. Similarly, the annunciator 13 may be a sounder that can be controlled to emit one out of different tones, say one word out of many, and play a selected music out of a list of songs and the like. In such a case, one of the states may be activated as a response for a single hit, the number of hits sensed or as a response to the hit magnitude, one of states of the annunciator 13 is activated. For example, the annunciator 13 state may be changing (e.g., according to a pre-set states changing scheme) after each hit sensed. In another example, the number of hits is reflected in the annunciator 13 state. Similarly, multiple annunciators may be used, where the annunciation is based on activating one of the annunciators, or based on the activation of a combination of the annunciators.

In one example, randomness is added to the logic that activates or controls the annunciator 13 in response to the acceleration sensed by the motion sensor 46. For example, the random activation of the annunciator 13 in response to a sensed hit may be implemented. In the case where 55% is the pre-set probability embedded in the ball 40 logic, only 55% of the hits results in any activation of the annunciator 13, or any other change in its state. Similarly, any other type of the annunciator 13 activation such as duty-cycle, cycling, state changing may be random-based, adding to the amusement of playing with it.

The logic block 12 may include a counter for calculating and storing the number of times a particular event or process has occurred. For example, a counter may be used to count the number of times sensed acceleration was above a pre-determined threshold ('hit'). The annunciator 13 may display the counter value, or alternatively the annunciator 13 may be activated or controlled based on the event count. Further, the annunciator 13 may be activated or controlled based on an event when the counted number exceeds a pre-determined value. For example, an annunciator may activate a lamp when the number of sensed hits exceeds the number five. The annunciator 13 may be a numerical display for visually indicating the number of hits or any other value based on the counter value. The counter may be implemented in software (or firmware), where a register content is used to store consecutive integers representing the events count. Further, a counter may be mechanical or electromechanical, as known in the art. Alternatively or in addition, a counter may be electronically implemented by a digital hardware using flip-flops. Example of electronic counters having a numerical display that may be used are electronic pulse counter model Codix 130 and LCD module 192 available from Fritz Kübler GmbH and respectively described in Fritz Kübler GmbH catalog Pulse Counters, electronic chapter, describing LCD Module 192 in page 77 and Codix 130 in pages 56-57, which are incorporated in their entirety for all purposes as if fully set forth herein.

Ball.

In one aspect of the invention, the device 10 is shaped as a ball or any other toy-like structure. Such a ball can be used in any ball game, such as dribbling, kicking, catching and other, wither for a single player or where two persons are throwing the ball from one to the other, where annunciator 13 responds to the playing activities, based on a logic in the logic block 12. Preferably, the components of the device are mounted centrally in the ball structure so that the ball is not untowardly unevenly balanced due to any significant off-center weighting. Further, the ball may be filled with plastic foam.

Additional possible shapes include interior cavity shapes equivalent to sphere, multi-sphere, egg, football, ovoid and multi-ovoid shapes; unlimited exterior shapes including but not limited to those of the interior shapes plus irregular spheres in the approximate size and with the approximate texture of a scoop of ice cream, animal figures, geometric shapes, spikes, vegetable and fruit shapes, other food product shapes such as a roast chicken, beef knuckle bone, irregular shapes, novelty shapes and the like that would additionally allow for pleasant grabbing texture and surface variety for a pet or a person. Preferably the shape allows for regular or irregular rolling patterns.

Figures 4A, 4B:
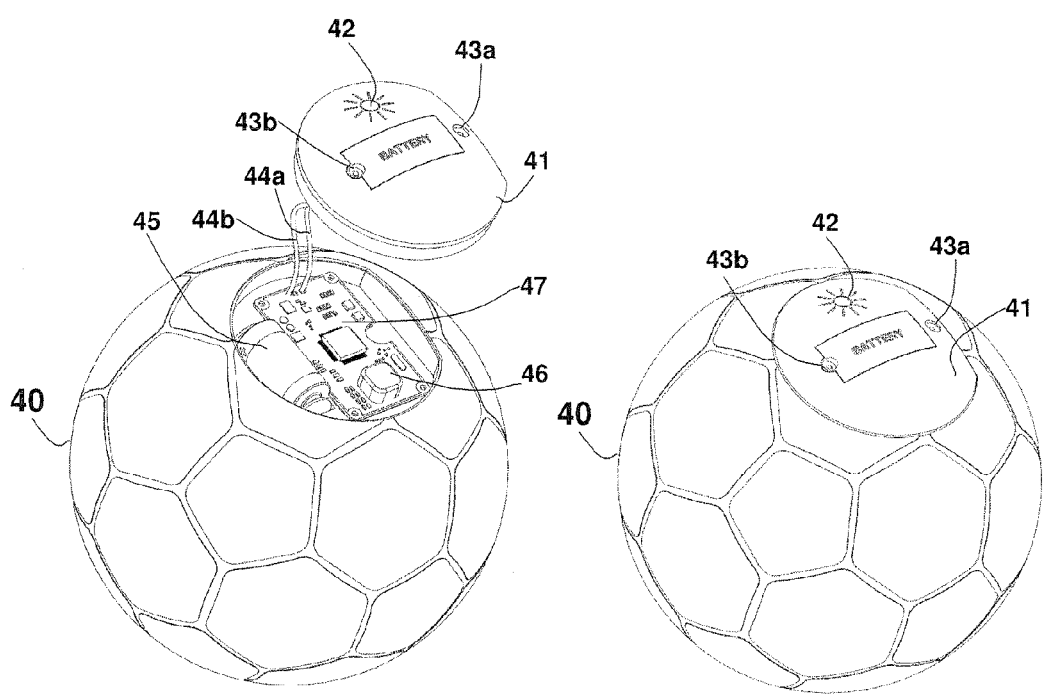
FIGS. 4a and 4b depict schematically a ball-shaped device including an LED in an example according to one aspect of the invention.

In one example, the device 10 is enclosed in a soccer-shaped ball 40 used as a toy shown in FIGS. 4*a* and 4*b*. The power supply 14 is implemented by the battery 45 (primary or rechargeable), housed in a cavity inside the ball 40. A cover 41 is removably secured to the ball housing, and the can be mounted into or removed from the ball 40 structure using screws via the holes 43*a* and 43*b*, thus allowing for replacement of the battery 45 upon its exhaustion. The cover 41 conforms to the outer surface of the ball 40 and fits flush with the outer surface that surrounds the aperture into which the cover 41 is inserted. An LED 42 is mounted on the cover 41, providing a visual indication to the user/player. The motion sensor 11 is implemented using a PCB (Printed Circuit Board) mounted 3-axis accelerometer 46. A PCB 47 is used as a mechanical base and for electrical connection of the electronic components implementing part or all of the logic block 12 functionalities. The LED 42 is connected to the electronic circuits on the PCB 47 via wires 44*a* and 44*b*. Similarly, the battery 45 is connected to the PCB 47 circuits in order to power them. FIG. 4*a* shows the ball 40 open having the cover 41 separated from the enclosure of the ball 40, and FIG. 4*b* shows the cover 41 attached as part of the ball 40 structure, thus forming a substantially spherical body resembling a common play ball.

The ball 40 is can be used in any ball game, such as dribbling, kicking, catching and other, wither for a single player or where two persons are throwing the ball from one to the other, where visual indication by the LED 42 responds to the playing activities. The cover 41 may alternatively be secured to ball 40 housing opening using bayonets. Further, the ball 40 housing may be comprised of two half spheres that may mate together along a substantially circular edge, where one half sphere includes a plurality of sockets positioned to circumference for mating with a plurality of corresponding pins in the second half sphere, as described for example in U.S. Pat. No. 6,484,671. Alternatively or in addition, the ball components may be housed in a cylindrical plastic housing that is housed in the ball which is formed with peripheral formations and aperture to house the cylinder, as described for example in U.S. Pat. No. 5,375,839.

In one example, a 'hit' of the play ball 40 is detected by sensing any acceleration above a pre-defined magnitude. The threshold value is determined such as to sense the throwing, kicking or catching of the ball 40. For example, the logic 12 will be set to detect any acceleration in any direction which is above 2 g. The LED 42 is responsive to such sensed bounce or 'hit'. In one example, the LED 42 lit for a pre-defined time (e.g. 2 seconds) any time a 'hit' is detected. Alternatively, the LED 42 changes states between blanking to lighting each time a hit is sensed, such that it will illuminate only after an odd number of hits, and stays blank after even numbers of hits. In another example, the LED 42 is responsive to the number of hits detected, for example during a defined period or counted as long as pre-set period between hits has not expired. In such example, the LED 42 lit only after pre-set number of hits. For example, the LED 42 lit only after 10 hits were detected in a 15 seconds period. Alternatively, the LED 42 lit after 10 hits, wherein the measured time between successive hits is less than 4 seconds.

The LED 42 may annunciate by flashing or blinking, where the LED 42 is gleaming or glowing intermittently few times for a short duration each time, where either the blinking rate or the number of lit periods are based on the sensed motion. Preferably, during flashing the period of time of illumination is equal to the period of non-illumination. For example, the LED 42 may flash according to the number of sensed hits in a pre-defined period, or as long as hits are being sensed, or the number of sensed hits is accumulated and stored, and shown as the numbers of blinks after a pre-set rest period (when no hits are sensed during that period). Similarly, the LED 42 is activated in response to the magnitude of a sensed hit. For example, a strong hit, such as sensed by high magnitude of acceleration, will affect the number of blinks, where a hit of 10 g may result in 10 blinks, and a hit of 5 g will create a response of 5 blinks. In such a case, the logic block 12 may include few thresholds at different acceleration magnitude levels, where crossing higher threshold will result in more number of blinks. Alternatively or in addition, the hit count or the hit magnitude may be used to change the blinking rate of the LED 42, where higher hits count or stronger hit will affect higher flashing rate or duty-cycle.

While the operation of the LED 42 has been described above as having two states, blank ('OFF' state) and lit ('ON' state), the LED 42 activation or control may also be continuous such as changing the illumination intensity, or any other changing of the light energy or power emitted. In such configuration, the LED 42 illumination intensity is based on the motion sensed by the motion sensor 46. For example, the illumination intensity may be increased at each hit sensed or based on the number of hits sensed in a defined period. Similarly, the LED 42 illumination intensity may reflect the strength of the hit sensed by measuring the peak of the acceleration magnitude. The changing intensity may be combined with the number of flashes, the duty cycle or any other activation scheme of the LED 42.

In one example, the LED 42 is a multi-color LED, and one of the colors is illuminated as a response for a single hit, the number of hits sensed or as a response to the hit magnitude. For example, the LED 42 color is changing (e.g., according to a pre-set color changing scheme) after each hit sensed. In another example, the number of hits is reflected in the LED 42 emitted color. Further, the color is darker (or lighter) or otherwise affected by the measured magnitude of the acceleration. Similarly, multiple single-color LEDs may be used, where the annunciation is based on the LED that illuminates, or based on the combination of the illuminating LEDs.

In one example, randomness is added to the logic that activates or controls the LED 42 in response to the acceleration sensed by the motion sensor 46. For example, the random activation of the LED 42 in response to a sensed hit may be implemented. In the case where 55% is the pre-set probability embedded in the ball 40 logic, only 55% of the hits results in any activation of the LED 42, or any other change in its state. Similarly, any other type of the LED 42 activation such as duty-cycle, flashing, color changing (in the case of multi-color LED) may be random-based, adding to the amusement of playing with it.

Figures 6A, 6B:
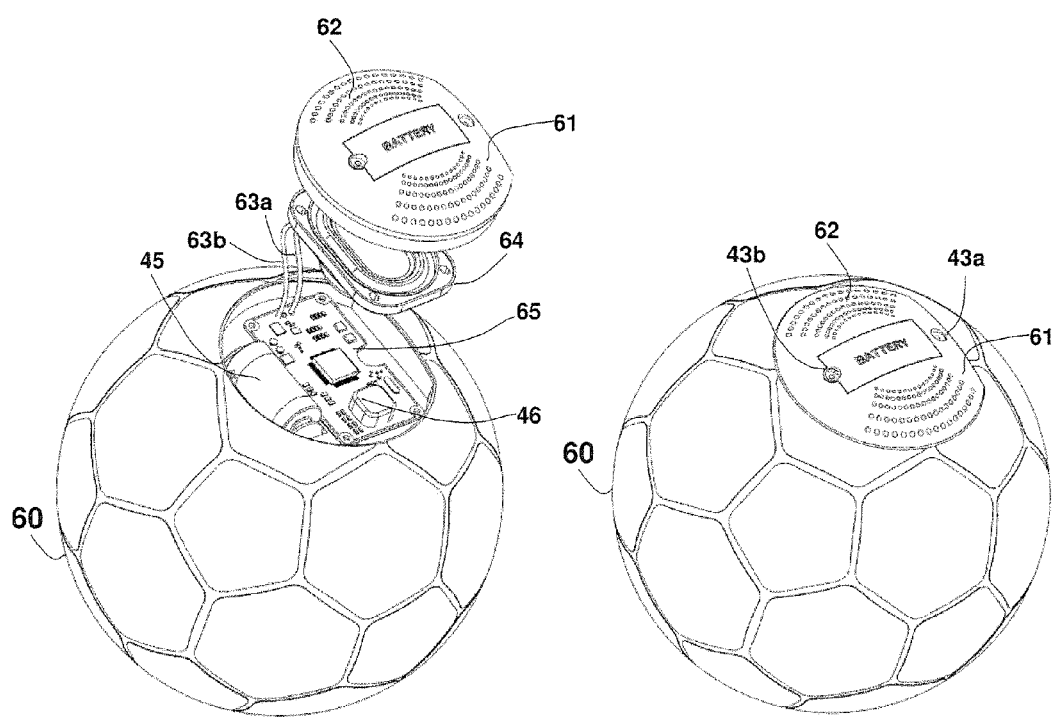
FIGS. 6a and 6b depict schematically a ball-shaped device including a speaker in an example according to one aspect of the invention.

While the soccer-shaped ball 40 described above included a LED 42 as a visual indicator implementing the annunciator 13, the invention equally applies to the case of a ball 60 including an audible annunciator (as an alternative or addition to the LED 42) as shown in FIGS. 6a and 6b, where FIG. 6a shows an exploded view of the ball 60. The power supply 14 is implemented by the battery 45 (primary or rechargeable), housed in a cavity inside the ball 60. A cover 61 can be mounted into or removed from the ball 60 structure mating circular aperture using screws via the holes 43a and 43b, thus allowing for replacement of the battery 45 upon its draining. A speaker 64 is attached the cover 61, providing an audible indication such as voice or any other sound to the user/player via the holes screen 62. The motion sensor 11 is implemented using a PCB (Printed Circuit Board) mounted 3-axis accelerometer 46. A PCB 65 is used as a mechanical base and for electrical connection of the electronic components implementing part or all of the logic block 12 functionalities. The speaker 64 is connected to the electronic circuits on the PCB 65 via wires 63a and 63b. Similarly, the battery 45 is connected to the PCB 65 circuits in order to power them. FIG. 4a shows the ball 60 open having the cover 61 separated from the housing of ball 60, and FIG. 4b shows the cover 61 attached as part of the ball 60 structure, thus forming a substantially spherical body resembling a common play ball. The ball 60 is can be used in any ball game, such as dribbling, kicking, catching and other, wither for a single player or where two persons are throwing the ball from one to the other, where the sound emitted from the speaker 64 responds to the playing activities.

In one example, a 'hit' of the play ball 40 is detected by sensing any acceleration above a pre-defined magnitude. The threshold value is determined such as to sense the throwing, kicking or catching of the ball 40. For example, the logic 12 will be set to detect any acceleration in any direction which is above 2 g. The LED 42 is responsive to such sensed 'hit'. In one example, the LED 42 lit for a pre-defined time (e.g. 2 seconds) any time a 'hit' is detected. Alternatively, the LED 42 changes states between blanking to lighting each time a hit is sensed, such that it will illuminate only after an odd number of hits, and stays blank after even numbers of hits. In another example, the LED 42 is responsive to the number of hits detected, for example during a defined period or counted as long as pre-set period between hits has not expired. In such example, the LED 42 lit only after pre-set number of hits. For example, the LED 42 lit only after 10 hits were detected in a 15 second period. Alternatively, the LED 42 lit after 10 hits, wherein the measured time between successive hits is less than 4 seconds.

The speaker 64 may annunciate by sounding tone, ring, voice, melody or song, as well as text-based message such as syllable, word, phrase or sentence, under the control of the embedded logic. The speaker 64 may provide the sound continuously or intermittently, such as few cycles of a short duration on each time, where either the sounding repetition rate or the number of sounding periods are based on the sensed motion. Preferably, during cycling the period of time of sounding is equal to the period of silencing. For example, the speaker 64 may ring or emit sounding periods according to the number of sensed hits in a pre-defined period, or as long as hits are being sensed, or the number of sensed hits is accumulated and stored, and shown as the numbers of sounding cycles after a pre-set rest period (when no hits are sensed during that period). Similarly, the speaker 64 may be activated in response to the magnitude of a sensed hit. For example, a strong hit, such as sensed by high magnitude of acceleration, will affect the number of the sounding cycles, where a hit of 10 g may result in 10 cycles, and a hit of 5 g will create a response of 5 sounding cycles. In such a case, the logic block 12 may include few thresholds at different acceleration magnitude levels, where crossing higher threshold will result in more number of cycles. Alternatively or in addition, the hits count or the hit magnitude may be used to change the sounding rate of the speaker 64, where higher hits count or stronger hit will affect higher sounding rate or duty-cycle.

While the operation of the speaker 64 has been described above as having two states, silence ('OFF' state) and sounding ('ON' state), the speaker 64 activation or control may also be continuous such as changing the tone frequency or the sound volume, or any other changing of the emitted acoustic signal. In such configuration, the volume emitted by the speaker 64 (or its frequency or both) is based on the motion sensed by the motion sensor 46. For example, the volume may be increased at each hit sensed or based on the number of hits sensed in a defined period. Similarly, the speaker 64 illumination intensity may reflect the strength of the hit sensed by measuring the peak of the acceleration magnitude. The changing volume may be combined with the number or types of the emitted sounds, the duty cycle or any other activation scheme of the speaker 64.

In one example, the ball 60 is capable of emitting multiple sounds, such as various tones, melodies, words, phrases and the like. Commonly one of the possible sounds is announced as a response for a single hit, the number of hits sensed or as a response to the hit magnitude. For example, the speaker 64 may announce a different word such as 'good work', 'excellent' and 'congratulations' (e.g., according to a pre-set announcing scheme) after each hit sensed. In another example, the number of hits is reflected in the ball 60 emitted voices. In one example, the ball 60 announce the counting of hits sensed, such that the word 'one' will be announced after the first hit, the number 'two' will be announced after the second hit and so forth. Similarly, the ball 60 may announce the strength of the sensed hit, such as based on the peak level of the acceleration sensed. For example, in case of peak acceleration in the range of 4.5-5.5 g the ball 60 will announce 'five g', and for the range of 8.9-9.5 g the phrase 'nine g' will be announced.

In one example, randomness is added to the logic that activates or controls the sounds emitted by the speaker 64 in response to the acceleration sensed by the motion sensor 46. For example, random sounding in response to a sensed hit may be implemented, where some of the hits will be responses by a sound and in some the ball remains silent. In the case where 55% is the pre-set probability embedded in the ball 60 logic, only 55% of the hits results in any activation of the speaker 64, or any other change in its state. Similarly, any other type of the speaker 64 activation such as selecting a one, word, music, word, phrase and others may be random-based selected, adding to the amusement of playing with it.

Figure 9:
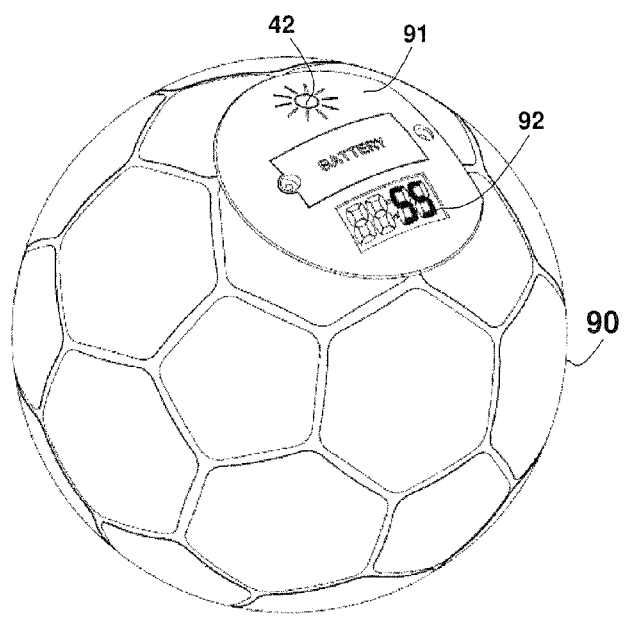
FIG. 9 depicts schematically a ball-shaped device including a numerical display in an example according to one aspect of the invention.

In another example, a ball 90 having a numeric display 92 is shown in FIG. 9, added to the LED 42 described as part of the ball 40 shown in FIGS. 4a-4b. The numeric display 92 is part of the cover 91, and is used to display numbers, such as the number '55' shown in FIG. 9. The number displayed may represent the number of hits or the strength of the last sensed hit.

Power.

The ball 40 was described above in FIGS. 4a and 4b as being powered from the battery 45. The battery may be a primary battery or cell, in which an irreversible chemical reaction generates the electricity, and thus the cell is disposable and cannot be recharged, and need to be replaced after the battery is drained. Such battery replacement is expensive and cumbersome. Alternatively, a rechargeable (secondary) battery may be used, such as a nickel-cadmium based battery. In such a case, a battery charger is employed for charging the battery while not in use.

Figure 5:
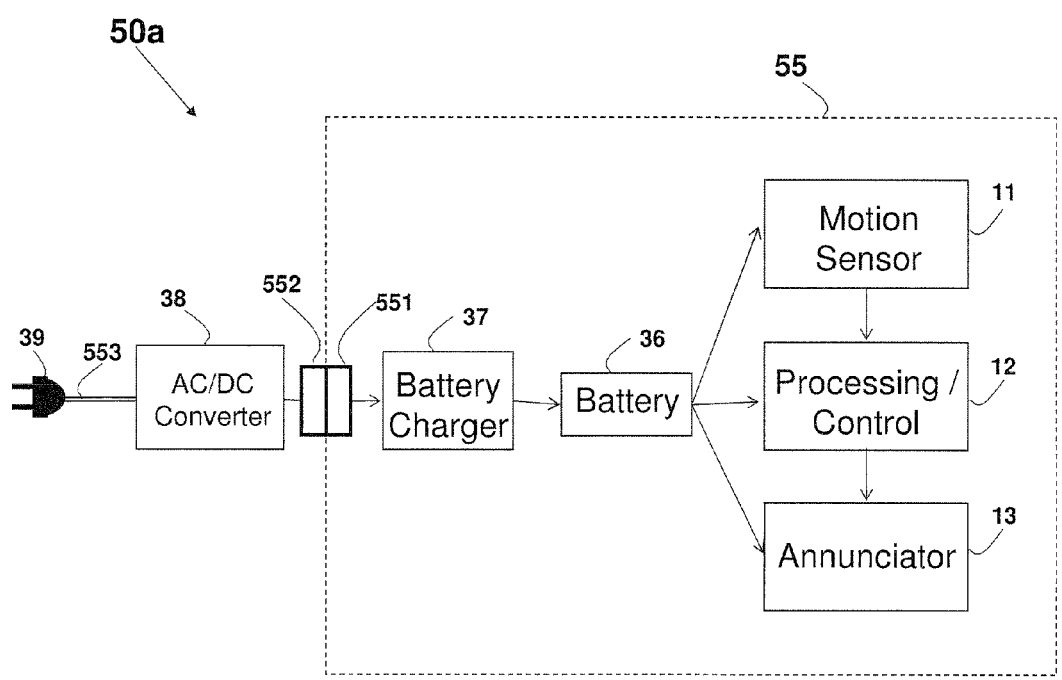
FIG. 5 illustrates an electrical schematic block diagram of an AC power charging device according to one aspect of the invention.

A block diagram 50a of a rechargeable battery 36 based device according to one aspect of the invention is shown in FIG. 5. A battery charger 37 is an electrical circuit connected to the rechargeable battery 36 and provides a forced and controlled voltage and/or current to a battery to put electrical energy into it. Various types of such battery chargers are known in the art, such as trickle chargers, pulse chargers and the like. The device 55 enclosure connects via connector 551 to a mating connector 552 for connecting to a power source, such as the AC/DC converter 38. The AC/DC converter 38 is commonly power fed from a domestic AC power through AC plug 39 and cord 553, and commonly includes a step-down transformer. The AC/DC converter 38 is used for converting the AC power (commonly 115 VAC/60 Hz or 220 VAC/50 Hz) into the required DC voltage or voltages. Such power supplies are known in the art and typically involves converting 120 or 240 volt AC supplied by a power utility company to a well-regulated lower voltage DC for electronic devices. For example, a small outlet plug-in step-down transformer shape can be used as the AC/DC converter 38, also known as wall-wart, "power brick", "plug pack", "plug-in adapter", "adapter block", "domestic mains adapter", "power adapter", or AC adapter. The charging associated components, such as the battery charger 37, the AC/DC converter 38, the AC plug 39, and the cable 553, may be housed in a separate enclosure, and connected via a connector to the device 55 housing, housing the electric cell or cells 36. Similarly, the AC/DC converter 38 may be housed within the device 55 enclosure, and having a single connector for connecting via cord 553 and AC plug 39 to the AC power supply. Hence, each or both of the battery charger 37 and the AC/DC converter 38 may be integrated with the device 55 enclosure or in a separate housing.

Figure 5A:
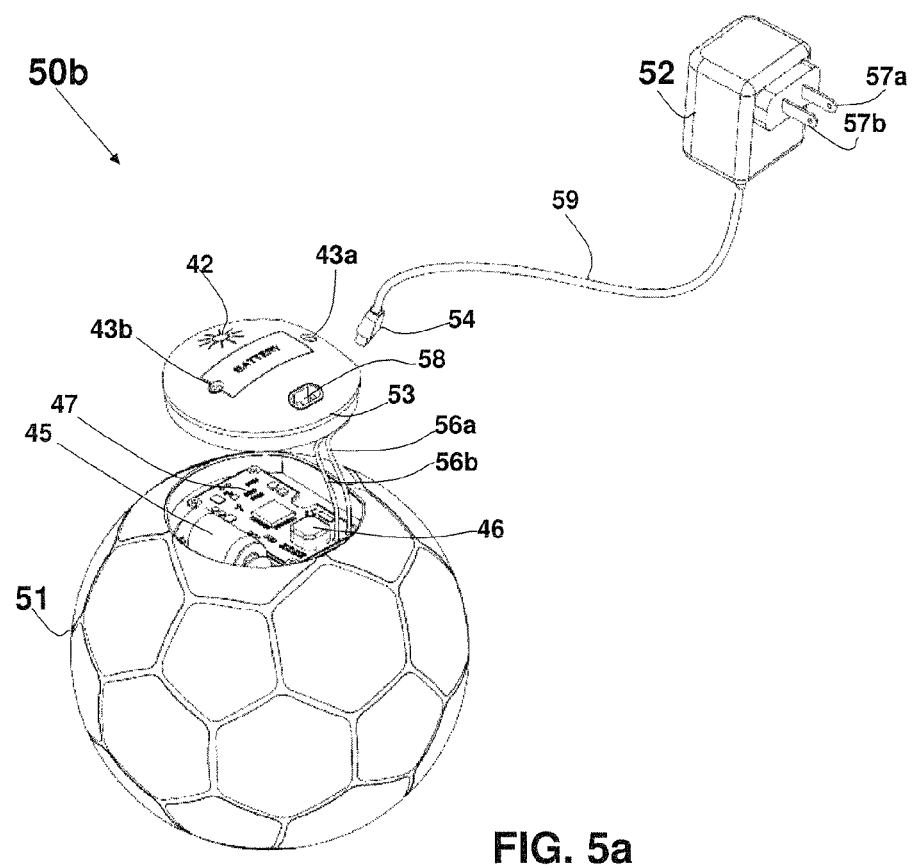
FIGS. 5a and 5b depict schematically a ball-shaped device including a LED and AC power recharging in an example according to one aspect of the invention.
Figure 5B:
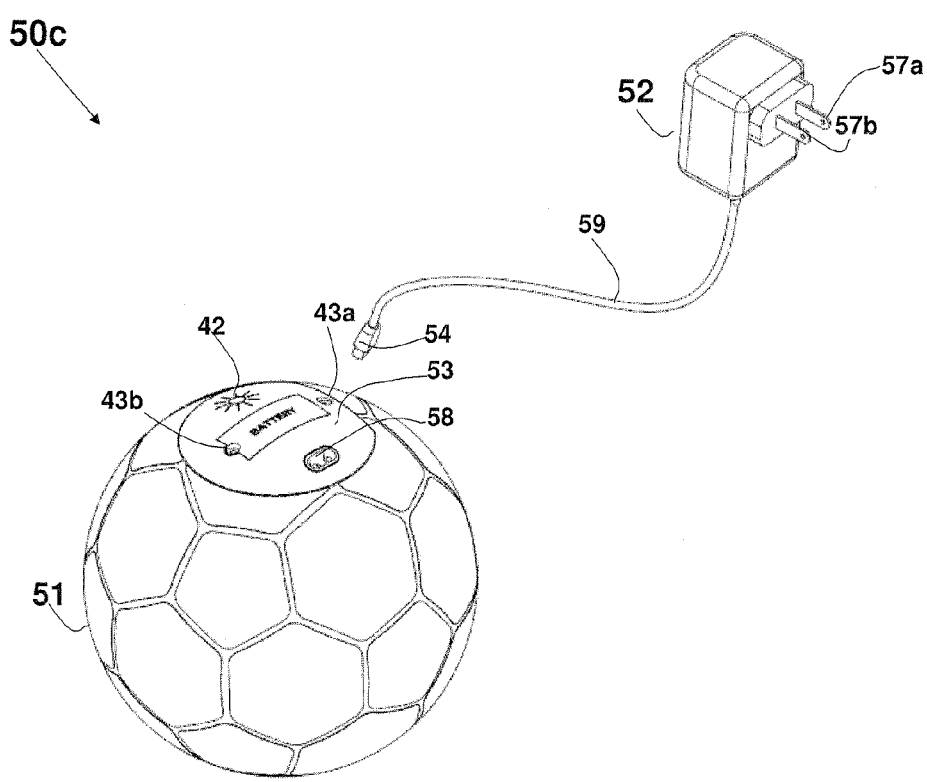

An example of a ball 51 comprising cover 53 and including a rechargeable battery 45 is shown in FIGS. 5a and 5b respectively showing views 50b (showing open cover 53) and 50c (showing cover 53 installed). During charging, an AC/DC converter device 52 (corresponding to AC/DC converter 38) is used, having prongs 57a and 57b (corresponding to AC power plug 39) for connecting to an AC power outlet for receiving the AC power (either 120 VAC (e.g., in North America) or 220 VAC (e.g., in some countries in Europe). The DC power is fed to a load via cord 50 and connector 54 (corresponding to connector 552). The ball 51 includes a battery charger circuit 37 on the PCB 47, connected to plug 58 which mates with the feeding socket 54 via wires 56a and 56b. When engaging the mating connectors 54 and 58 and connecting the AC/DC converter 52 to an AC power source, the battery 45 is being charged, obviating the need to remove the cover 53 for physical access to replace the battery 45.

Figure 8:
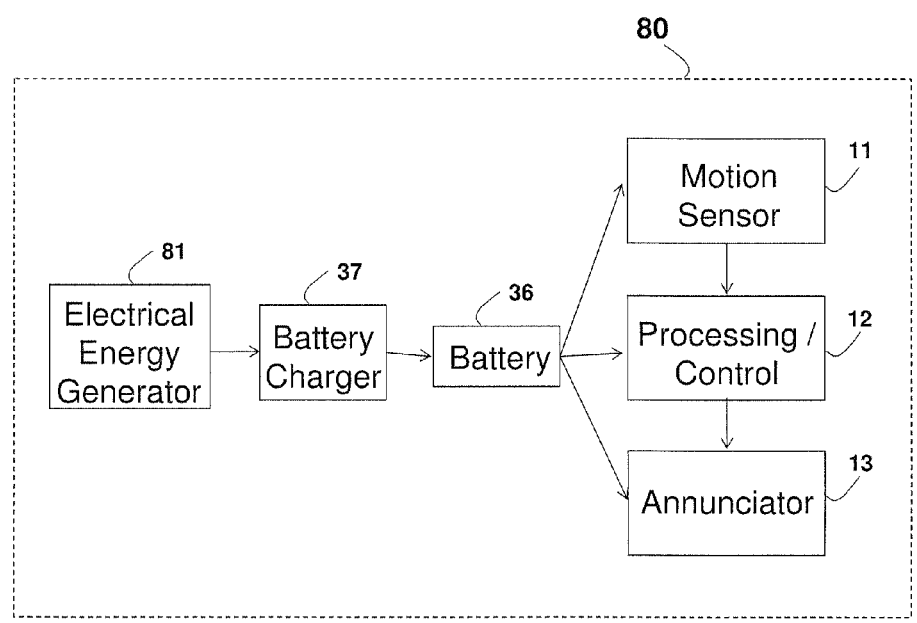
FIG. 8 illustrates an electrical schematic block diagram of kinetic to electrical energy charging device according to one aspect of the invention.

In another example, the device is locally energized. Such a device 80 is shown in FIG. 8 using an electrical energy generator 81 to locally generate electrical power for charging the rechargeable battery 36 via the battery charger 37. Preferably, the generator 81 is integrated within the device 80 enclosure. Alternatively or in addition, the generator 81 may directly feed the power consuming components in the device 80 without using any electrical energy storage device such as the rechargeable battery 36. Such generator 81 may be based on converting kinetic energy harvested from the device 80 motion, which may be caused by a human or animal activity, to electrical energy. Such generator 81 is described in U.S. Pat. No. 7,692,320 to Lemieux titled: "Electrical Energy Generator", in U.S. Pat. No. 5,578,877 to Tiemann titled: "Apparatus for Converting Vibratory Motion to Electrical Energy", in U.S. Pat. No. 7,847,421 to Gardner et al. titled: "System for Generating Electrical Energy from Ambient Motion" and in U.S. Patent Application 2007/0210580 to Robets et al. titled: "Electromechanical Generator for, and Method of, Converting Mechanical Vibrational Energy into Electrical Energy", as well as a battery-shaped generator described in U.S. Pat. No. 7,688,036 to Yarger et al. titled: "System and Method for Storing Energy", which are all incorporated in their entirety for all purposes as if fully set forth herein. In the case of a device 80 shaped as a ball and used for ball gaming such as ball 40 described in FIGS. 4a and 4b, the game commonly involves moving the ball, thus providing kinetic energy that can be used to power feed the ball power-consuming components. In this case, the battery 45 may be replaced by the battery-shaped generator such as described by Yarger et al.

Figure 8A:
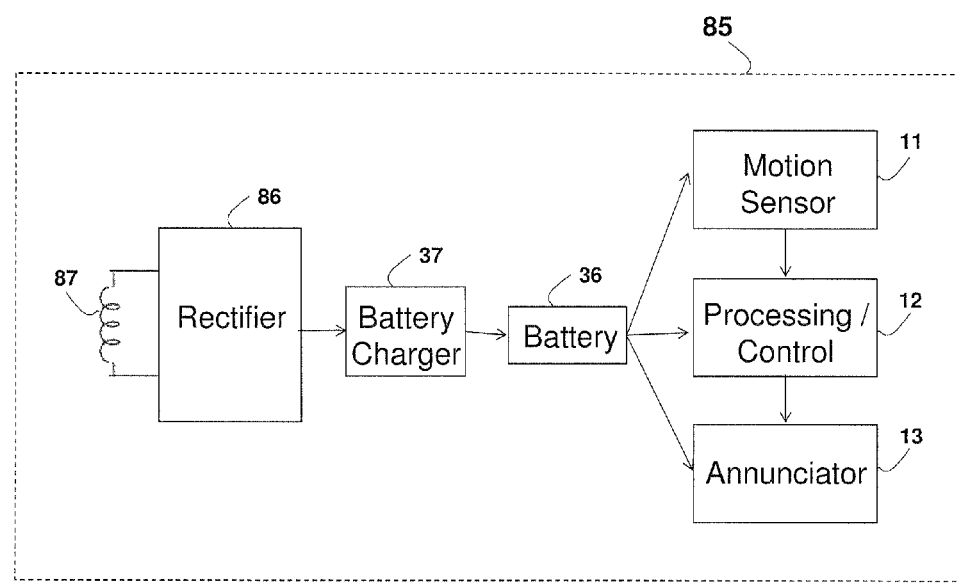
FIG. 8a illustrates an electrical schematic block diagram inductively charging device according to one aspect of the invention.

While the invention was exampled in FIGS. 5a-5c above with regard to a direct and conductive charging, thus requiring connectors 58 and 54 to be engaged, in one example a contactless charging is used, such as by using inductive coupling where the energy is transferred using an electromagnetic field. In inductive coupling a charging station sends energy using a transmitter induction coil to the device to be charged, which includes a receiving induction coil inductively coupled to the transmitter coil. The received power is commonly used to charge a rechargeable battery in the device. In such a configuration there is no need for any connectors or for connector engagement, thus making it easy to use, impermeable to water and dirt and with improved shape and look. A device 85 capable of inductive charging is shown in FIG. 8a. The receiving coil 87 is designed to receive energy when properly positioned in an electromagnetic field. The received signal is rectified by rectifier 86 and further processed or conditioned as required. The electric power is then feeding the battery charger 37 which charge the secondary cell 36. Contactless battery charging systems are described in U.S. Pat. No. 6,208,115 to Binder titled: "Battery Substitute Pack", in U.S. Pat. No. 7,863,859 to Soar titled: "Contactless Battery Charging Apparel", in U.S. Pat. No. 7,872,445 to Ron Hui titled: "rechargeable Battery Powered Portable Electronic Device", in U.S. Pat. No. 7,906,936 to Azancot et al. titled: "rechargeable Inductive Charger", in U.S. Pat. No. 7,863,861 to Cheng et al. titled: "Contact-Less Power Transfer" and in U.S. Pat. No. 7,876,067 to Greenfeld et al. titled: "High Frequency Connector-Less Charging Scheme", which are all incorporated in their entirety for all purposes as if fully set forth herein.

Figure 7A:
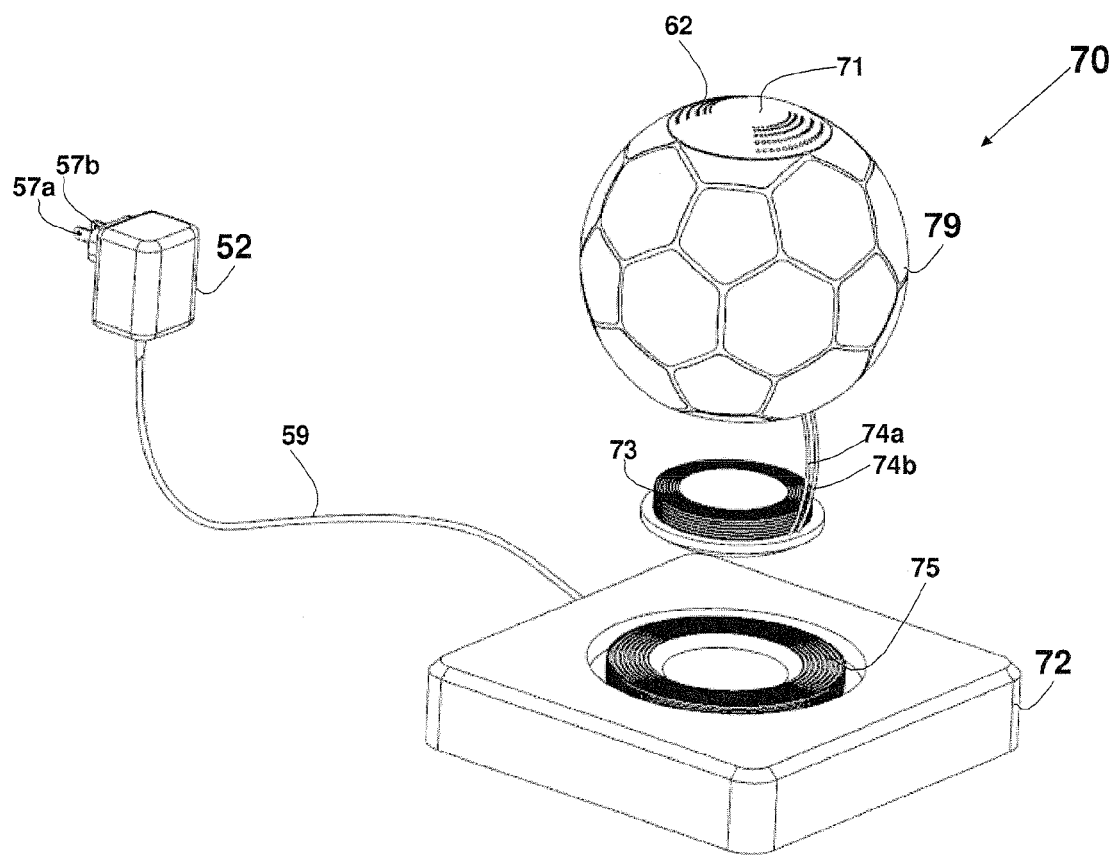
FIGS. 7a, 7b, 7c and 7e depict schematically exploded views of a ball-shaped device including a speaker and inductive battery charging system in an example according to one aspect of the invention.
Figure 7B:
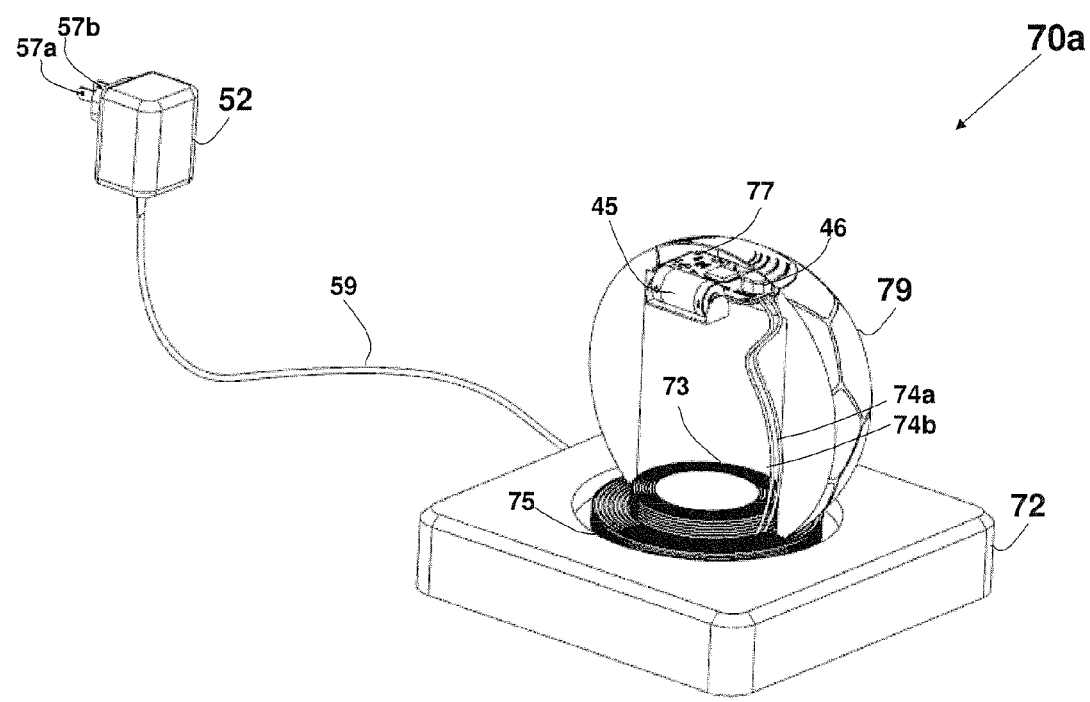
Figure 7C:
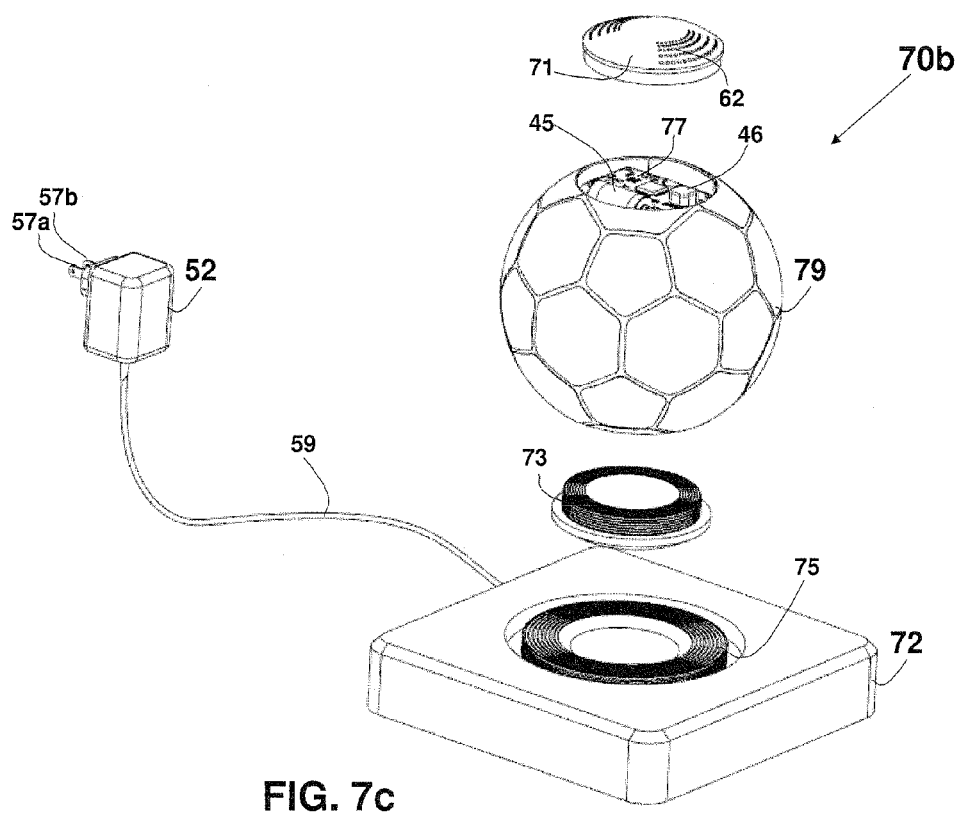
Figure 7D:
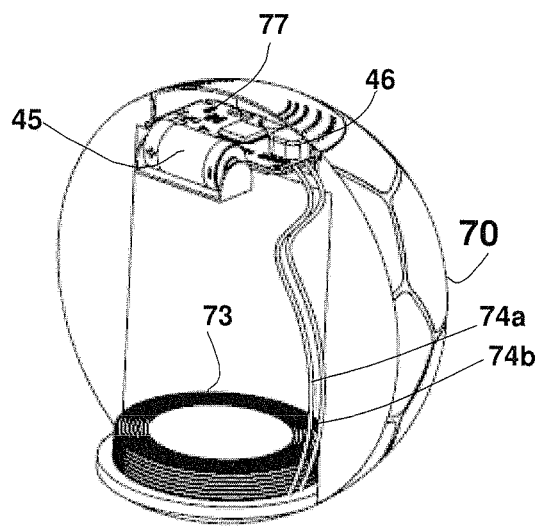
FIG. 7d depicts schematically a ball-shaped device including a speaker capable of inductive battery charging in an example according to one aspect of the invention.
Figure 7E:
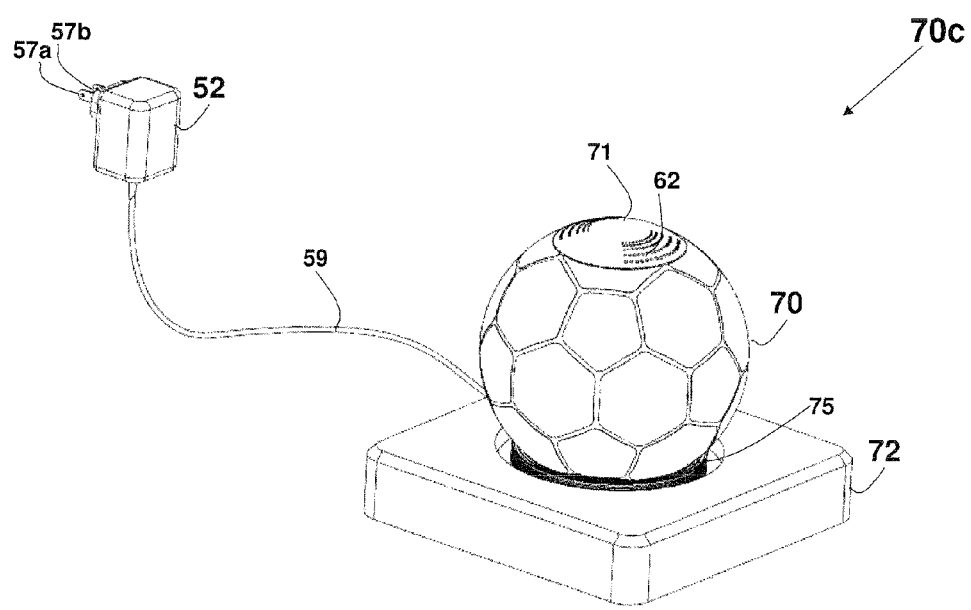

An example of a ball 79 capable of contactless inductive charging and a charging station 72 is shown in FIGS. 7a-7e. The ball 70 comprises a receiving coil 73 (corresponding to inductor 87), connected via wires 74a and 74b to the PCB 77, which is carrying the required electronic circuits (such as rectifier 86 and battery charger 37), hence when the coil 73 is in the electromagnetic field generated by the charger 72, the rechargeable battery 45 is charged. The charger 72 includes a coil 75 which generates the electromagnetic field, and is fed from the AC power by the AC/DC converter 52 having prongs 57a and 57b, feeding the charger 72 via the cable 59. The ball 79 is exampled having an audible annunciator and a cover 71 similar to the ball 60 shown in FIGS. 6a-6b. Thus when the ball 79 is placed on the charger 72 such that the coils 73 and 75 are inductively coupled to each other, energy for charging the battery 45 is received from the charger 72. FIG. 7a shows a view 70 of the charging system 72 and the ball 79 where the coil 73 is shown separated from the ball 79 housing, FIG. 7b shows a view 70a of a cut in the ball 79 when placed on the charger 72 for charging, FIG. 7c shows a view 70b of the charging system 72 and the ball 79 where the coil 73 and the cover 71 are shown separated from the ball 79 housing, FIG. 7d shows a cut view of the ball 79 and FIG. 7e shows a view 70c of the closed ball 79 placed on the charger 72 for charging.

Handheld Device.

Figure 10:
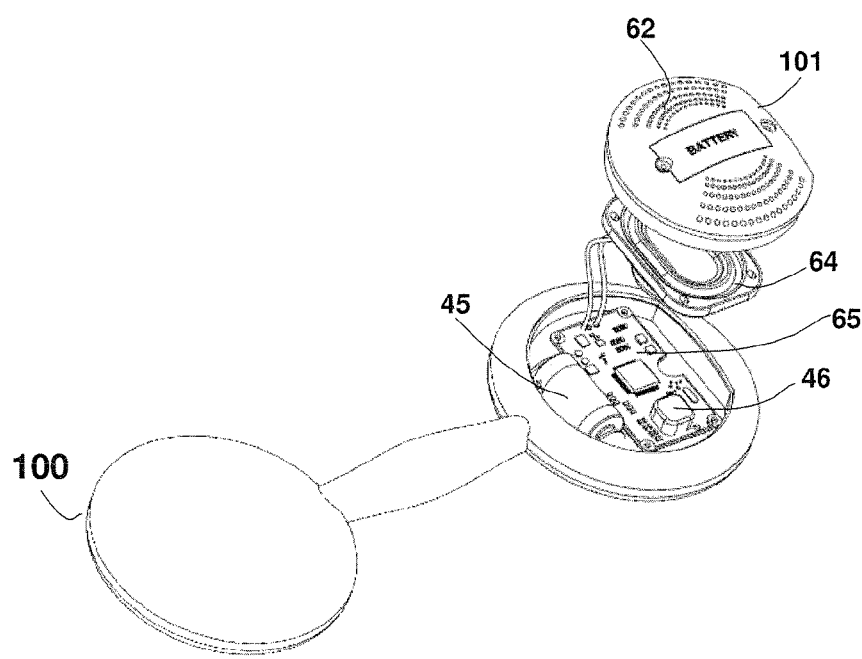
FIG. 10 depicts schematically an exploded view of an example of a handheld device according to one aspect of the invention.
Figures 10A, 10B, 10C:
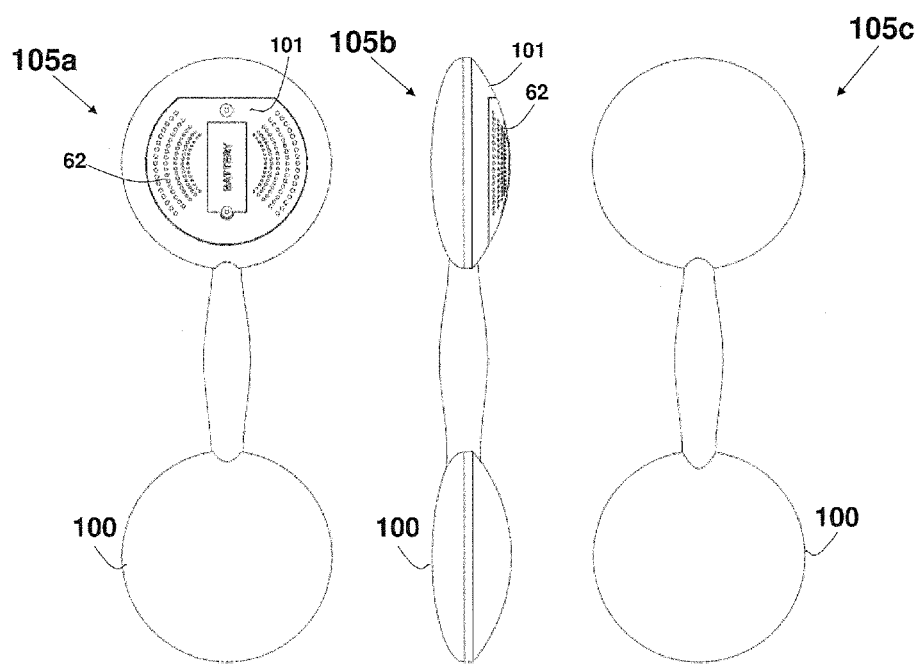
FIGS. 10a, 10b and 10c depict schematically front, side and rear views of an example of a handheld device according to one aspect of the invention.
Figure 10D:
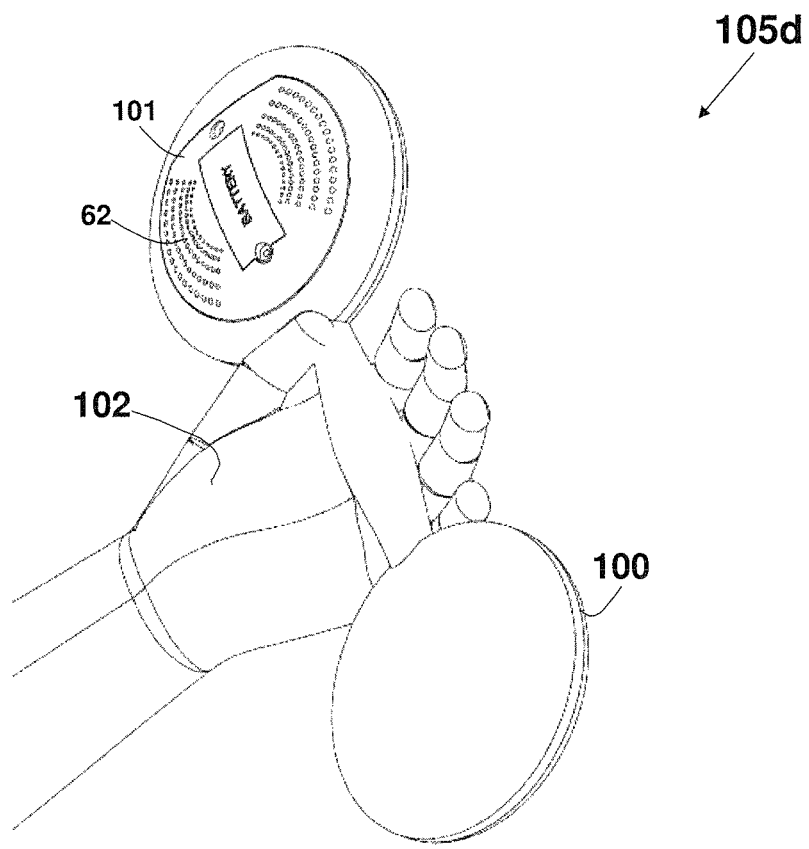
FIG. 10d depicts schematically the use of a handheld device according to one aspect of the invention.

In an aspect of the invention, a handheld device 100 is used, as described in FIGS. 10-10d. FIG. 10 shows an exploded view of the handheld device 100, FIGS. 10a, 10b and 10c respectively shows front 105a, side 105b and rear 105c views of the handheld device 100, and FIG. 10d shows a view 105d of the device 100 held in a hand 102. Similar to the ball 60 described in FIGS. 6a and 6b, the handheld device 100 comprises a cover 101 (similar to the cover 61 of ball 60). The handheld device 100 includes two thin, flat, circular plates ('disks') mechanically attached to the ends of a long thin cylinder rod, thus allowing easy gripping in a palm. While shown with the loudspeaker 64, any type of annunciator 13 may be equally used. Another example of a handheld device including an accelerometer and used for control is described in U.S. Pat. No. 7,774,155 to Sato et al. titled: "Accelerometer-Based Controller", which is incorporated in its entirety for all purposes as if fully set forth herein.

Figure 11A:
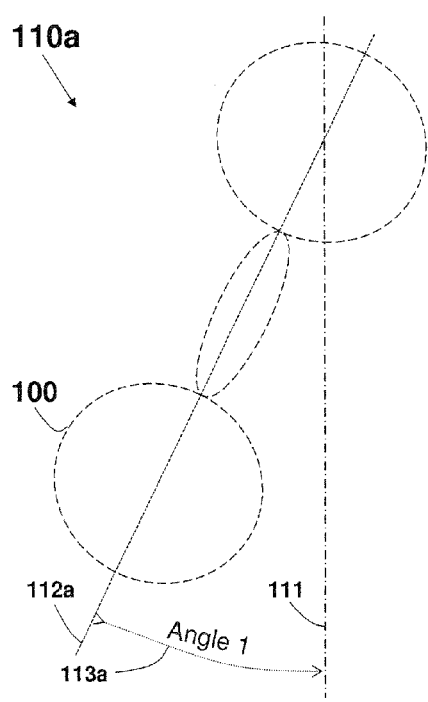
FIGS. 11a and 11b depict schematically views of an example of a tilted handheld device according to one aspect of the invention.
Figure 11B:
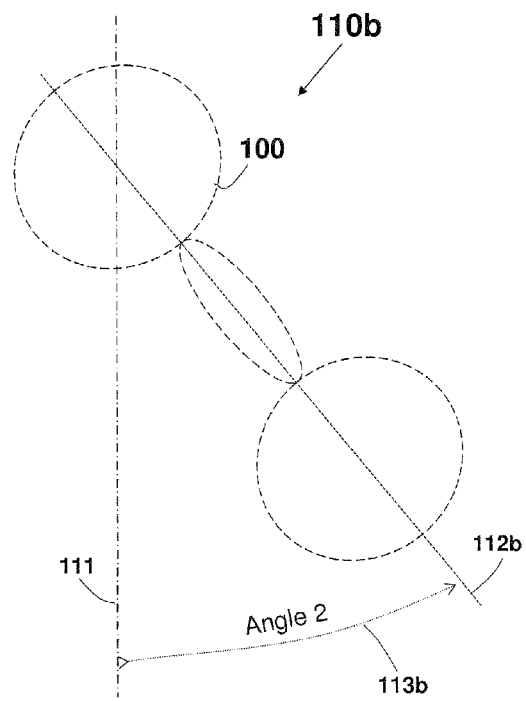

In one example, the direction of device 10 such as its tilt is used to activate or control the annunciator 13, such as the amount of the inclination or bending from a vertical position as sensed by the motion sensor 11, which can be a tilt detector. FIGS. 11a and 11b respectively show the views 110a and 110b of the device 100 in various tilt positions. In view 110a, the handheld device 100 axis 112a is shown tilted by angle 1 113a left from the vertical 111, while in view 110b, the handheld device 100 axis 112b is shown tilted by angle 2 113b right from the vertical 111. The tilting angle (such as angle 1 113a) is sensed by the motion sensor 46, and the loudspeaker 64 (corresponding to an annunciator 13), is activated or controlled according to the sensed tilt angle, such as its sign (right or left) or its value. For example, the tone sounded from the loudspeaker 64 may correspond to the tilting angle.

Further, the acceleration magnitude sensed may also be used in combination to the sensed tilt angle to control the annunciator 13. For example, the handheld device 100 may be used as a musical instrument. In this case, the tilt angle may correspond to the type of sound heard, and the acceleration sensed in that direction may correspond to the sound volume. In an example, the tilt angle corresponds with a musical note, where the tilt angle range +50 degrees to +40 degrees will affect the musical note 'DO', the tilt angle range +40 degrees to +30 degrees will affect the musical note 'RE', the tilt angle range +30 degrees to +20 degrees will affect the musical note 'MI' and so forth. A hit (such as sensed acceleration magnitude passing a threshold) will result in the playing of the note associated with that tilt angle, while the sounding volume may also be controlled by acceleration magnitude. The sound produced by such devices can emulate the sounds of any conventional acoustical music instruments, such as a piano, tuba, harp, violin, flute, guitar and so forth. In one example, the device can further be shaped as a miniature of the music instrument associated with its emitted sound.

While the invention has been exampled above with regarding to a ball-shaped device such as ball 60 in FIG. 6a or as handheld device such as device 100 in FIGS. 10a-10c, any enclosure may be equally used. For example, a rectangular cross-section box with all sides flat (or substantially flat) may be used. Similarly, the box used may have (or be based on) a cross section (horizontal or vertical) that is square, elongated, round or oval; sloped or domed top surfaces, or non-vertical sides. Similarly, the shape of a cube or right rectangular prism can be used, or can be based upon. A horizontal or vertical circular cross section can be used (or be based upon) such as simple geometric shapes such as a, cylinder, sphere, cone, pyramid and torus. The device shape may be amorphous, abstract, organic, conceptual, virtual, irregular, regular, figurative, biomorphic, geometric, partially geometric, conventional, unconventional, symmetric and asymmetric. Similarly, the design can be abstract, symbolic, conceptual, virtual, realistic, relating to fantasy or dreams, and representational. Further, the devices and the connecting and attaching scheme can be designed and fabricated to fit any age and ability. Furthermore, the device can be fabricated of natural, man-made, composite and recycled material, such as paper, fabric, metal, wood, stone, rubber, foam, nylon, synthetic polymers, synthetic fibers, hard vinyl, polyamides, reciprocal and plastic. The device may be hollow or filled. Further, a device may have any suitably rigid, flexible, bendable, multi-sided, electronic, digital, magnetic, stationary, moving, mechanical, reciprocal, sensory-related section, including a mechanism such as activation point, button and switch.

The manner of play using the device according to the invention may be for diversified ages; diversified abilities; diversified approaches; specified age; specified ability; specified approach; creative; artistic; music-oriented; puzzle; recreational; educational; therapeutic; stage-oriented; level-oriented; family-oriented; age-appropriate; selective; thematic; turn indicated; timing indicated; scoring indicated; hierarchical; sequential; matching; choice; according to players, direction, playing order, number of players, teams; procedure indicated; having emission; introductory; junior; standard; intermediate; advanced; professional; numerical; alphabetical; identifying; positioning; pre-determined; improvisational; exchangeable; sharing; rotating; variable; same, different, switch, story, and customize-able.

While the invention has been exampled above with regard to a payload including an annunciator providing visual or audible signaling, it will be appreciated that the invention equally applies to a payload adapted to perform other functions, such as physical movement or other motive functions (e.g., pop-up figure). For example, the payload may include motors, winches, fans, reciprocating elements, extending or retracting, and energy conversion elements. In addition, heaters or coolers may be used. Each of the actuator or movement appearance, location, color, type, shape and functionality may be conceptually related to the device theme (such as image or shape). Further, the payload may include an indicator for indicating free-form, shape, form, amorphous, abstract, conceptual, representational, organic, biomorphic, partially geometric, conventional, unconventional, multi-sided, natural, figurative, recognizable concept, geometric, amorphous, abstract, organic, virtual, irregular, regular, biomorphic, conventional, unconventional, symmetric, asymmetric, man-made, composite, geometric, letter, number, code, and symbol. Furthermore, the payload may be indicating associated information such as indicia, indicator, theme indicator, turn indicator, timing indicator, game piece indicator, emission indicator, emission device, playing area indicator, scoring indicator, and procedure indicator. Further, the device may include sensors that will be part of the formed electrical circuit, such as photocells, voltage or current detectors, pressure detectors or motion detector and manually or automatically operated switches. Each of the sensor appearance, location, color, type, shape and functionality may be conceptually related to the device theme (such as image or shape).

The term "processor" is meant to include any integrated circuit or other electronic device (or collection of devices) capable of performing an operation on at least one instruction including, without limitation, Reduced Instruction Set Core (RISC) processors, CISC microprocessors, Microcontroller Units (MCUs), CISC-based Central Processing Units (CPUs), and Digital Signal Processors (DSPs). The hardware of such devices may be integrated onto a single substrate (e.g., silicon "die"), or distributed among two or more substrates. Furthermore, various functional aspects of the processor may be implemented solely as software or firmware associated with the processor.

As used herein, the terms "program", "programmable", "software", "firmware" and "computer program" are meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like, as well as in firmware or other implementations. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

All publications, standards, patents, and patent applications cited in this specification are herein incorporated by reference as if each individual publication, patent, or patent application were specifically and individually indicated to be incorporated by reference and set forth in its entirety herein.

Throughout the description and claims of this specification, any mechanical attachment between any two or more physical components may use means such as elastic straps, hook and loop fastener straps or patches, screws, bolts, adhesives, clips, clamps, carabineers, or any combination thereof.

Throughout the description and claims of this specification, the word "comprise" and variations of that word such as "comprises" and "comprising", is not intended to exclude other additives, components, integers or steps. Throughout the description and claims of this specification, the word "couple" and variations of that word such as "coupling", "coupled" and "couplable" refers to an electrical connection (such as a copper wire or soldered connection), a logical connection (such as through logical devices of a semiconductor device), a virtual connection (such as through randomly assigned memory locations of a memory device) or any other suitable direct or indirect connections, for example allowing for the transfer of power, signal or data.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof. The terms "plurality" and "a plurality" as used herein includes, for example, "multiple" or "two or more". For example, "a plurality of items" includes two or more items. The term "software integration" or integration of two programs or processes herein refers to software components (e.g. programs, modules, functions, processes etc.) that are (directly or via another component) combined, working or functioning together or form a whole, commonly for sharing a common purpose or set of objectives. Such software integration can take the form of sharing the same program code, exchanging data, being managed by the same manager program, executed by the same processor, stored on the same medium, sharing the same GUI or another user interface, sharing peripheral hardware (such as a monitor, printer, keyboard and memory), sharing data or a database, or being part of a single package. The term "hardware integration" or integration of hardware components herein refers to hardware components that are (directly or via another component) combined, working or functioning together or form a whole, commonly for sharing a common purpose or set of objectives. Such hardware integration can take the form of sharing the same power source (or power supply) or sharing other resources, exchanging data or control (e.g. by communicating), being managed by the same manager, physically connected or attached, sharing peripheral hardware connection (such as a monitor, printer, keyboard and memory), being part of a single package or mounted in a single enclosure (or any other physical collocating), sharing a communication port, or used or controlled with the same software or hardware. The term "integration" herein refers (as applicable) to a software integration, a hardware integration or a combination.

The term "computer-readable medium" as used herein refers to any medium that participates in providing instructions to processor 25 for execution. Such a medium may take many forms, including but not limited to, non-volatile media, volatile media, and transmission media. Non-volatile media includes, for example, optical or magnetic disks, such as storage device 23. Volatile media includes dynamic memory, such as main memory 22. Transmission media includes coaxial cables, copper wire and fiber optics, including the wires that comprise bus 24. Transmission media can also take the form of acoustic or light waves, such as those generated during radio-wave and infra-red data communications. A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof A computer readable signal medium may be any computer readable medium that is not a computer readable storage medium and that can communicate, propagate, or transport a program for use by or in connection with an instruction execution system, apparatus, or device.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Various forms of computer readable media may be involved in carrying one or more sequences of one or more instructions to processor 25 for execution. For example, the instructions may initially be carried on a magnetic disk of a remote computer. The remote computer can load the instructions into its dynamic memory and send the instructions over a telephone line using a modem. A modem local to computer system 20 can receive the data on the telephone line and use an infra-red transmitter to convert the data to an infra-red signal. An infra-red detector can receive the data carried in the infra-red signal and appropriate circuitry can place the data on bus 24. Bus 24 carries the data to main memory 22, from which processor 25 retrieves and executes the instructions. The instructions received by main memory 22 may optionally be stored on storage device 23 either before or after execution by processor 25.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), Erasable Programmable ROMs (EPROMs), Electrically Erasable Programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.).

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Those of skill in the art will understand that the various illustrative logical blocks, modules and circuits described in connection with the embodiments disclosed herein may be implemented in any number of ways including electronic hardware, computer software, or combinations of both. The various illustrative components, blocks, modules and circuits have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although exemplary embodiments of the present invention have been described, this should not be construed to limit the scope of the appended claims. Those skilled in the art will understand that modifications may be made to the described embodiments. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

As will be appreciated by those of skill in the art, the methods described above generally reside on one or more general purpose computing devices which operate under the control of computer executable instructions. The general purpose computing device need not be limited to computers and servers but may include hand-held devices, multiprocessor systems, microprocessor-based or programmable customer electronics, minicomputers, mainframe computers, and the like. Furthermore, the computer executable instructions may include routines, programs, objects, components, and/or data structures that perform particular tasks. Within the network, the computer executable instructions may reside on a single general purpose computing device or the tasks performed by the computer executable instructions may be distributed among a plurality of the general purpose computing devices.

In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps. Furthermore, other embodiments may use more or less steps than those discussed herein.

As used herein, the term "integrated circuit" shall include any type of integrated device of any function, whether single or multiple die, or small or large scale of integration, and irrespective of process or base materials (including, without limitation Si, SiGe, CMOS and GAs) including without limitation applications specific integrated circuits (ASICs), field programmable gate arrays (FPGAs), digital processors (e.g., DSPs, CISC microprocessors, or RISC processors), so-called "system-on-a-chip" (SoC) devices, memory (e.g., DRAM, SRAM, flash memory, ROM), mixed-signal devices, and analog ICs.

It will be appreciated that the aforementioned features and advantages are presented solely by way of example. Accordingly, the foregoing should not be construed or interpreted to constitute, in any way, an exhaustive enumeration of features and advantages of embodiments of the present invention.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A device for signaling in response to a sensed motion, the device having a single enclosure, and in the single enclosure comprising:
   an accelerometer for producing an output signal responsive to the device acceleration, the accelerometer is a piezoelectric, piezoresistive, capacitive, or Micro-mechanical Electrical Systems (MEMS) accelerometer;
   a visible light emitter for emitting a visible light signaling a first status to a person;
   an electric motor for affecting a physical movement; and
   a rechargeable battery connected to power the device, wherein the emitted light or the electric motor is activated or controlled in response to the output signal and a received wireless signal.

2. The device according to claim 1, further comprising a battery charger connected for contactless charging of the rechargeable battery.

3. The device according to claim 2, wherein the received wireless signal in an induction AC power signal.

4. The device according to claim 3, wherein the contactless charging is induction-based, and wherein the battery charger comprises, or consists of, an induction coil for inductively receiving the AC power signal when in an electromagnetic field, and for charging the rechargeable battery from the received AC power signal.

5. The device according to claim 1, wherein the physical movement is associated with the device image, theme, or shape.

6. The device according to claim 1, further comprising a battery compartment mechanically secured to the single enclosure for housing the rechargeable battery.

7. The device according to claim 6, wherein the single enclosure further comprising a securely removable cover for covering the battery compartment, so that when the cover is removed the battery compartment is accessible for replacing the rechargeable battery.

8. The device according to claim 1, further comprising a software and a processor for executing the software, the processor coupled to the accelerometer, to the electric motor, and to the visible light emitter, for activating or controlling the emitted light or the electric motor in response to the output signal.

9. The device according to claim 1, wherein the accelerometer produces the output signal in response to an absolute acceleration or to a relative-to-freefall acceleration of the enclosure.

10. The device according to claim 1, wherein the output signal is responsive to the magnitude or the direction of the device acceleration, and wherein the accelerometer is a single-axis, two-axis, or a three-axis accelerometer.

11. The device according to claim 1, further operative to sense or measure the device mechanical orientation, vibration, shock, or falling, based on, or using, the output signal.

12. The device according to claim 1, wherein the accelerometer comprises, consists of, uses, or is based on, a piezoelectric accelerometer that utilizes a piezoelectric effect and comprises, consists of, uses, or is based on, piezoceramics or a single crystal or quartz.

13. The device according to claim 1, wherein the visible light emitter consists of, comprises, is based on, or uses, a semiconductor component, an incandescent lamp, or fluorescent lamp.

14. The device according to claim 13, wherein the semiconductor component consists of, or comprises, a single color Light Emitting Diode (LED) or a multi-color LED.

15. The device according to claim 1, wherein the visible light emitter is operative to illuminate in multiple colors, and wherein the first status is indicated by changing between colors.

16. The device according to claim 1, further comprising an additional visible light emitter attached to the single enclosure and coupled for emitting a visible light indicating a second status to the person.

17. The device according to claim 1, wherein the first status is indicated by steadiness, blinking, intensity level, duty-cycle, or flashing, of the illumination of the visible light emitter.

18. The device according to claim 1, wherein the visible light emitter consists of, or comprises, a numerical display for displaying one or more digits representing a number.

19. The device according to claim 18, wherein the numerical display comprises, consists of, or uses, seven-segments display.

20. The device according to claim 1, wherein the visible light emitter consists of, or comprises, an alphanumeric display for displaying characters, numbers, letters, or symbols.

21. The device according to claim 1, wherein the visible light emitter consists of, or comprises, a flat-panel digital display for displaying graphical or text information.

22. The device according to claim 21, wherein the digital display is based on, comprises, or uses, a Liquid Crystal Display (LCD), a Thin-Film Transistor (TFT), or a Field Emission Display (FED) display.

23. The device according to claim 22, wherein the digital display is coupled using an interface that is according to, or based on, IEEE 1394, Universal Serial Bus (USB), Serial Digital Interface (SDI), FireWire™, High-Definition Multimedia Interface (HDMI), Digital Visual Interface (DVI), Unified Display Interface (UDI), or DisplayPort standard.

24. The device according to claim 1, wherein the visible light emitter consists of, or comprises a DLP display or a video projector.

25. A portable electronic device comprising the device according to claim 1.

26. The portable electronic device according to claim 25 consisting of, or comprising, a notebook computer, a laptop computer, a media player, a cellular telephone, a Personal Digital Assistant (PDA), a digital camera, a video recorder, or any combination thereof.

27. The device according to claim 1, further comprising a random number generator operative to output a random number, wherein the activating or controlling the emitted light or the electric motor is in response to the random number.

28. The device according to claim 27, wherein the random number generator is based on a physical process.

29. The device according to claim 28, wherein the physical process is one of a thermal noise, a shot noise, decaying nuclear radiation, a photoelectric effect, and a quantum phenomenon.

30. The device according to claim 27, wherein the random number generator is software-based, and a processor executes a pseudo-random number generator software.

31. The device according to claim 27, wherein the random numbers generated by the random number generator are substantially uniformly or Gaussianly distributed.

32. The device according to claim 1, further comprising a controlled switch connected for switching DC power from the rechargeable battery to the visible light emitter or to the electric motor, wherein the switch is controlled in response to the output signal.

33. The device according to claim 32, wherein the controlled switch is based on, comprises, or using, an electromechanical relay, a solid-state relay, or an optocouplers.

34. The device according to claim 1, further operative as a toy for an amusement of a person or a pet, wherein the single enclosure is configured, dimensioned, formed, or structured as a toy.

35. The device according to claim 1, further dimensioned and shaped as a handheld unit.

36. The device according to claim 35, wherein the single enclosure comprises, or shaped as, two substantially circular plates attached to both ends of a rod.

37. The device according to claim 1, wherein the single enclosure is substantially sphere shaped, and the device is operative for amusement or playing as a play ball.

38. The device according to claim 37, wherein the single enclosure is ball-shaped.

39. The device according to claim 38, wherein the single enclosure is substantially dimensioned, shaped, and structured as cricket, baseball, basketball, football, soccer, tennis, rugby, golf, or volleyball play ball.

40. The device according to claim 38, wherein the single enclosure is cylinder, half-sphere, prolate-spheroid, football, or ovoid shaped.

41. The device according to claim 38, wherein the device is operative to be used for dribbling, kicking, catching, or throwing by a single player or multiple players, and wherein the accelerometer is configured for respectively sensing the dribbling, kicking, catching, or throwing action.

42. The device according to claim 1, wherein the single enclose is substantially cylinder, cone, pyramid, or torus shaped.

43. The device according to claim 1, wherein the single enclosure is substantially box-shaped having a rectangular, square, elongated, or oval, horizontal or vertical cross-section.

44. The device according to claim 1, further comprising a sensor having an output responsive to a physical phenomenon, and wherein the activating or the controlling of the emitted light or of the electric motor is in response to the sensor output.

45. The device according to claim 44, wherein the sensor is an electric sensor that responds to an electrical characteristics or electrical phenomenon quantity in an electrical circuit.

46. The device according to claim 45, wherein the electric sensor consists of, comprises, or is based on, a voltage or current sensor.

47. The device according to claim 44, wherein the sensor is a light sensor.

48. The device according to claim 47, wherein the light sensor consists of, comprises, or is based on, a photocell.

49. The device according to claim 44, wherein the sensor is a force sensor.

50. The device according to claim 49, wherein the force sensor consists of, comprises, or is based on, a pressure sensor.

51. The device according to claim 1, further operative to sense or measure the device tilt angle based on the output signal.

52. The device according to claim 51, wherein the visible light emitter or the electric motor is activated or controlled in response to the sensed or measured device tilt angle.

53. The device according to claim 1, further comprising a counter coupled to the accelerometer for counting a number of events based on the output signal.

54. The device according to claim 53, wherein events are occurrences when the magnitude of the output signal cross an acceleration threshold.

55. The device according to claim 53, wherein the visible light emitter or the electric motor is activated or controlled in response to the counted number.

56. The device according to claim 53, wherein the counter is an electromechanical counter or a mechanical counter.

57. The device according to claim 53, wherein the counter is software-based counter included in the software.

58. The device according to claim 1, further comprising a peak-detector and a storage, respectively for detecting and storing a peak value of the sensed acceleration.

59. The device according to claim 58, further operative to activate or control the visible light emitter or the electric motor in response to the peak value.

60. The device according to claim 1, further comprising a timer for measuring a time interval, wherein the visible light emitter or the electric motor is activated or controlled to indicate to the person in response to a measured time interval between two events of the sensed acceleration being above an acceleration threshold.

61. The device according to claim 1, wherein the accelerometer is attached to the single enclosure.

\* \* \* \* \*